(12) United States Patent
Cho

(10) Patent No.: US 6,408,237 B1
(45) Date of Patent: *Jun. 18, 2002

(54) AIR BAG SYSTEM FOR AN AUTOMOBILE

(76) Inventor: Myungeun Cho, Balcones Station 11900 Jollyville Rd., Austin, TX (US) 78759

( * ) Notice: Subject to any disclaimer, the term of this patent is extended or adjusted under 35 U.S.C. 154(b) by 0 days.

This patent is subject to a terminal disclaimer.

(21) Appl. No.: 09/477,748

(22) Filed: Jan. 4, 2000

(51) Int. Cl.$^7$ .............................................. G06F 17/00
(52) U.S. Cl. ........................ 701/45; 180/169; 180/232; 180/271; 340/903; 340/435; 340/436; 280/730.2; 280/736
(58) Field of Search .............................. 701/45, 46, 47; 180/167, 169, 232, 271; 340/903, 425.5, 435, 436; 280/730.2, 736

(56) References Cited

U.S. PATENT DOCUMENTS

| | | | |
|---|---|---|---|
| 5,071,160 A | * 12/1991 | White et al. | 280/735 |
| 5,330,226 A | * 7/1994 | Gentry et al. | 280/735 |
| 5,482,314 A | * 1/1996 | Corrado et al. | 280/735 |
| 5,646,613 A | * 7/1997 | Cho | 340/903 |
| 5,959,552 A | * 9/1999 | Cho | 340/903 |

* cited by examiner

Primary Examiner—Gertrude Arthur

(57) ABSTRACT

An air bag system for an automobile including an external detection system, an internal detection system, a wireless system, a computer processing unit (CPU), at least one external air bag inflation device, and at least one internal air bag inflation device. The air bag system controls inflation size and absorption quantity of an air bag by means that the CPU receives information from the external detection system, the internal detection system, and the wireless system for a calculation based on the information inputted in the CPU and transmits control signal to the relevant parts of the air bag inflation device to enable the external air bag and the internal air bag to effectively inflate for protecting automobile body and object against damage and passengers against personal injury from a collision.

58 Claims, 24 Drawing Sheets

INFORMATION INPUTTED IN CPU

| 106 : criterion for inflation of an external air bag of the roadway vehicle |
|---|
| 107 : inflation sizes and shapes of an external air bag of the roadway vehicle based on various collision situations |
| 108 : absorption quantity of an external air bag of the roadway vehicle in conformity with impact intensity |
| 109 : criterion for estimated injury inflicted to passengers from a collision |
| 110 : inflation sizes and shapes of an internal air bag of the roadway vehicle |
| 111 : absorption quantity of an internal air bag of the roadway vehicle |
| 112 : location of each external air bag inflation device on the roadway vehicle |
| 113 : location of each internal air bag inflation device on the roadway vehicle |
| 114 : minimum allowable time window (MATW) |
| 115 : estimated period of time |
| 116 : nature of the roadway vehicle |
| 117 : net weight of the roadway vehicle |
| 118 : shape of the roadway vehicle and size of the shape |
| 119 : nature of the external air bag of the roadway vehicle |

FIG 32

EXTERNAL DETECTION SYSTEM & CPU

| |
|---|
| 120 : moving speed of the roadway obstacle relative to the roadway vehicle |
| 121 : direction of motion of the roadway obstacle relative to the roadway vehicle |
| 122 : moving location of the roadway obstacle relative to the first sensing device on the roadway vehicle based on shape of the roadway obstacle and size of the shape |
| 123 : location of an external air bag inflation device on the roadway obstacle |
| 124 : nature of the roadway obstacle |
| 125 : gross weight of the roadway obstacle |
| 126 : nature of the external air bag on the roadway obstacle |

FIG 33

WIRELESS SYSTEM & CPU

| 123 : location of an external air bag inflation device on the roadway obstacle |
|---|
| 124 : nature of the roadway obstacle |
| 125 : gross weight of the roadway obstacle |
| 126 : nature of the external air bag on the roadway obstacle |
| 127 : location of the roadway obstacle |
| 128 : inflation size and shape of an external air bag in an applicable zone of the roadway obstacle |
| 129 : absorption quantity of an external air bag in an applicable zone of the roadway obstacle |

FIG 34

INTERNAL DETECTION SYSTEM & CPU

| 130 : position, posture, and size of passengers |
|---|
| 131 : weight of passengers |
| 132 : weight of goods |

FIG 35

AIR BAG SYSTEM FOR AN AUTOMOBILE

BACKGROUND OF THE INVENTION

1. Field of the Invention

The present invention relates to an air bag system against automobile collision and specifically relates to a computer processor based system for controlling air bag inflation size and air bag absorption quantity for reducing injury to passengers and reducing damage to vehicles and objects involved in an accident.

2. Description of the Related Art

Various schemes have been adopted to protect passengers of a vehicle from injuries resulting from collisions. Numerous attempts in the art from bumper construction to air bags to vehicular control and warning systems have come about to protect the occupants of the vehicle. A plethora of patents exemplify various automotive devices known for human protection. For example, U.S. Pat. No. 4,673,937 issued on Jun. 16, 1987 to Davis describes a Doppler radar system for a vehicle providing driver warning, vehicle brake application and air bag deployment. U.S. Pat. No. 5,071,160 issued to White et al. on Dec. 10, 1991 describes a circuit for actuating a vehicle passenger safety restraint such as an air bag. U.S. Pat. No. 5,330,226 issued to Gentry et al. on Jul. 19, 1994 describes an apparatus for controlling actuation of a vehicle occupant restraint system. U.S. Pat. No. 5,482,314 issued to Corrado et al. on Jan. 9, 1996 describes a system for sensing the presence, position, and type of an occupant in a passenger seat of a vehicle for use in enabling or disabling a related air bag activator. U.S. Pat. No. 5,785,347 issued to Adolph et al. on Jul. 28, 1998 describes an occupant sensing and crash behavior system for a motor vehicle determines the presence and location of an occupant to then control the deployment of supplemental restraint systems such as air bag or inflatable seat/shoulder belts. U.S. Pat. No. 5,829,782 issued on Nov. 3, 1998 to Breed et al. describes a vehicle interior identification and monitoring system to identify and monitor contents and/or parts of the passenger compartment of a motor vehicle. U.S. Pat. No. 5,871,232 issued on Feb. 16, 1999 to White describes an occupant position sensing system.

German Patent No. 2 256 146 issued on Jun. 7, 1973 describes a vehicle air cushion to prevent injury during a collision to occupants of an automobile. German Patent No. 3 809 074 issued on Oct. 5, 1989 describes an air bag protection system for a vehicle. German Patent No. 4 005 598 issued on Aug. 29, 1991 describes a method of protecting motor vehicle occupants that involves detecting the acceleration of the vehicle and activating an occupant protection device when a defined level of acceleration is exceeded.

Despite this regard for reducing human danger, in most collisions the damage to the vehicle is unmitigated; creating substantial costs for repair or replacement. Few proposals have been made to reduce the cost of repair or replacement of an automobile involved in a collision. U.S. Pat. No. 4,906,019 issued on Mar. 6, 1990 to Takase et al. describes a motor vehicle collision sensing device. U.S. Pat. No. 5,106,137 issued on Apr. 21, 1992 to Curtis describes a vehicle bumper with combination foam and air bag energy absorber. U.S. Pat. No. 5,314,037 issued on May 24, 1994 to Shaw et al. describes an automobile collision avoidance system. U.S. Pat. No. 5,461,357 issued on Oct. 24, 1995 to Yoshioka et al. describes a obstacle detection device for a vehicle for detecting an obstacle so the vehicle can take a responsive and appropriate action for avoiding the obstacle.

U.S. Pat. No. 5,565,870 issued on Oct. 15, 1996 to Fukuhara et al. describes a radar apparatus that measures a distance to a target and the relative speed of the target. U.S. Pat. No. 5,633,705 issued on May 27, 1997 to Asayama describes an obstacle detecting system for a motor vehicle which is capable of detecting not only the distance to an obstacle existing in front of the motor vehicle and the width thereof, but also its height to thereby allow a motor vehicle control to be effected more appropriately with high reliability. U.S. Pat. No. 5,646,613 issued to Cho on Jul. 8, 1997 describes a system for minimizing automobile collision damage using radiant energy detectors and externally deployed air bags for aiding in damage reduction of automobile collisions. U.S. Pat. No. 5,959,552 issued to Cho on Sep. 28, 1999 describes a system for minimizing automobile collision damage and personal injury using detection sensor unit, computer processing unit (CPU), energy absorbing inflation devices, and external and internal air bag inflation devices.

German Pat. No. 2 922 273 issued on Jan. 22, 1981 describes a vehicle collision safety device with an inflatable air bag that transmits an ultrasonic beam ahead of a vehicle to detect an approaching obstacle. European Patent No. 0 210 079 issued on Jan. 28, 1987 describes a Doppler radar system for a motor vehicle.

However, none of the above inventions and patents taken either singularly or in combination, except U.S. Pat. Nos. 5,646,613 and 5.959.552, describe an air bag system capable of providing collision protection against both personal injuries and automobile body damage. Thus a system for inflation of air bag solving the aforementioned problems is desired.

SUMMARY OF TEE INVENTION

The present invention is an air bag system for an automobile. The air bag system serves to provide collision protection against injury to passengers and pedestrians and damage to vehicles and objects. The system includes at least one external air bag inflation device, at least one internal air bag inflation device, an external detection system, an internal detection system, a wireless system, and a computer processing unit. The external detection system is installed in the automobile body, lamp post, and satellite for detecting information relating to vehicles, objects, and pedestrians. The internal detection system is installed in the automobile body for detecting information relating to passengers and goods inside the automobile. The wireless system installed in the automobile body, lamp post, and satellite for providing information to a CPU. The CPU installed in the automobile is provided information by the external detection system, the internal detection system, and the wireless system to process the information to control the function of each related device installed in the external air bag inflation device installed inside of the automobile body and the function of each related device installed in the internal air bag inflation device installed inside of the automobile body.

Accordingly, it is a principal object of the invention to provide an automobile air bag system with the CPU function to control inflation, inflation size of the air bag, and impact absorption of the external and internal air bags.

It is another object of the invention to provide an automobile air bag system with a structure of external and internal air bag inflation devices.

These and other objects of the present invention will become readily apparent upon further review of the following specification and drawings.

BRIEF DESCRIPTION OF THE DRAWINGS

FIG. 32 is a listing of information inputted into the CPU according to a preferred embodiment of the present invention.

FIG. 33 is a listing of information obtained by the external detection system and calculated by the CPU according to a preferred embodiment of the present invention.

FIG. 34 is a listing of information obtained by the first wireless apparatus and calculated by the CPU according to a preferred embodiment of the present invention.

FIG. 35 is a listing of information obtained by the internal detection system and calculated by the CPU according to a preferred embodiment of the present invention.

DETAILED DESCRIPTION OF THE PREFERRED EMBODIMENTS

Figure 2:
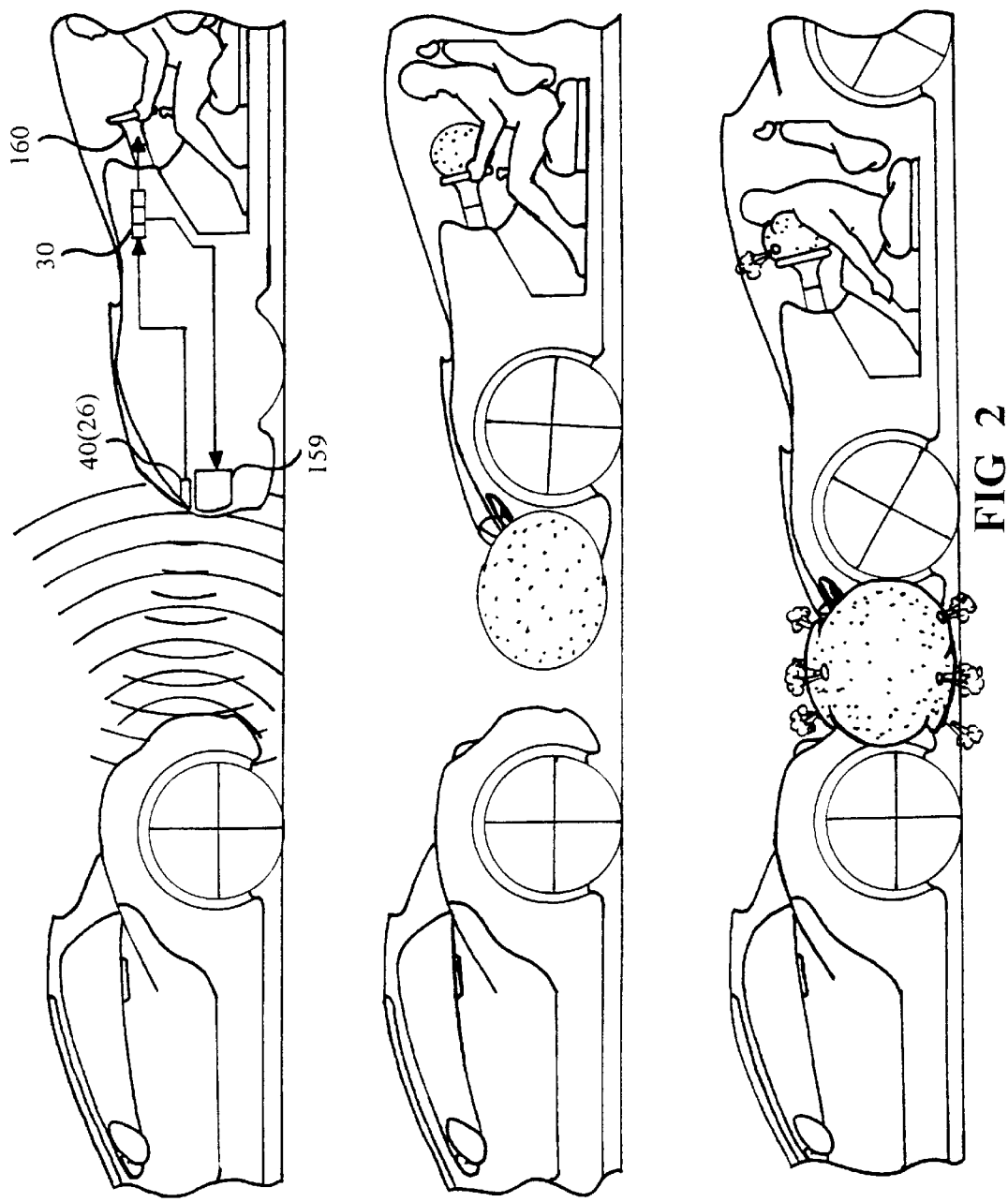
FIG. 2 is an illustration of the operation sequence of an air bag system according to the present invention.
Figure 3:
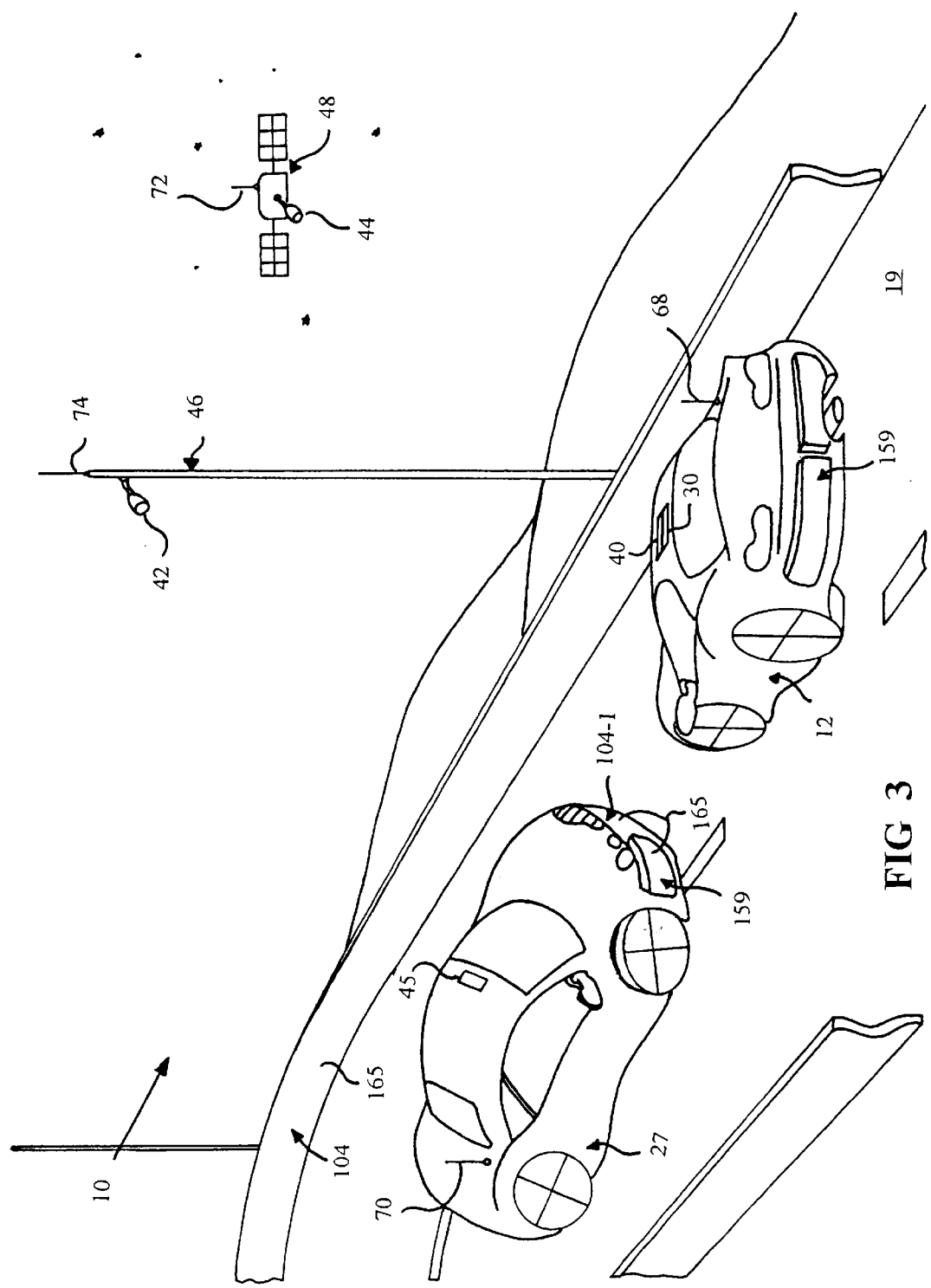
FIG. 3 is an environmental view of an air bag system according to a preferred embodiment of the present invention.

The present invention is an air bag system for an automobile. An environmental perspective view of an air bag system 10 is shown in FIG. 3. Structural components of the air bag system will be described with reference to FIGS. 1 and 2 and FIGS. 4 through 8 and FIGS. 36 and 37, and software components of the air bag system will be described with reference to FIGS. 9 through 35.

Figure 1:
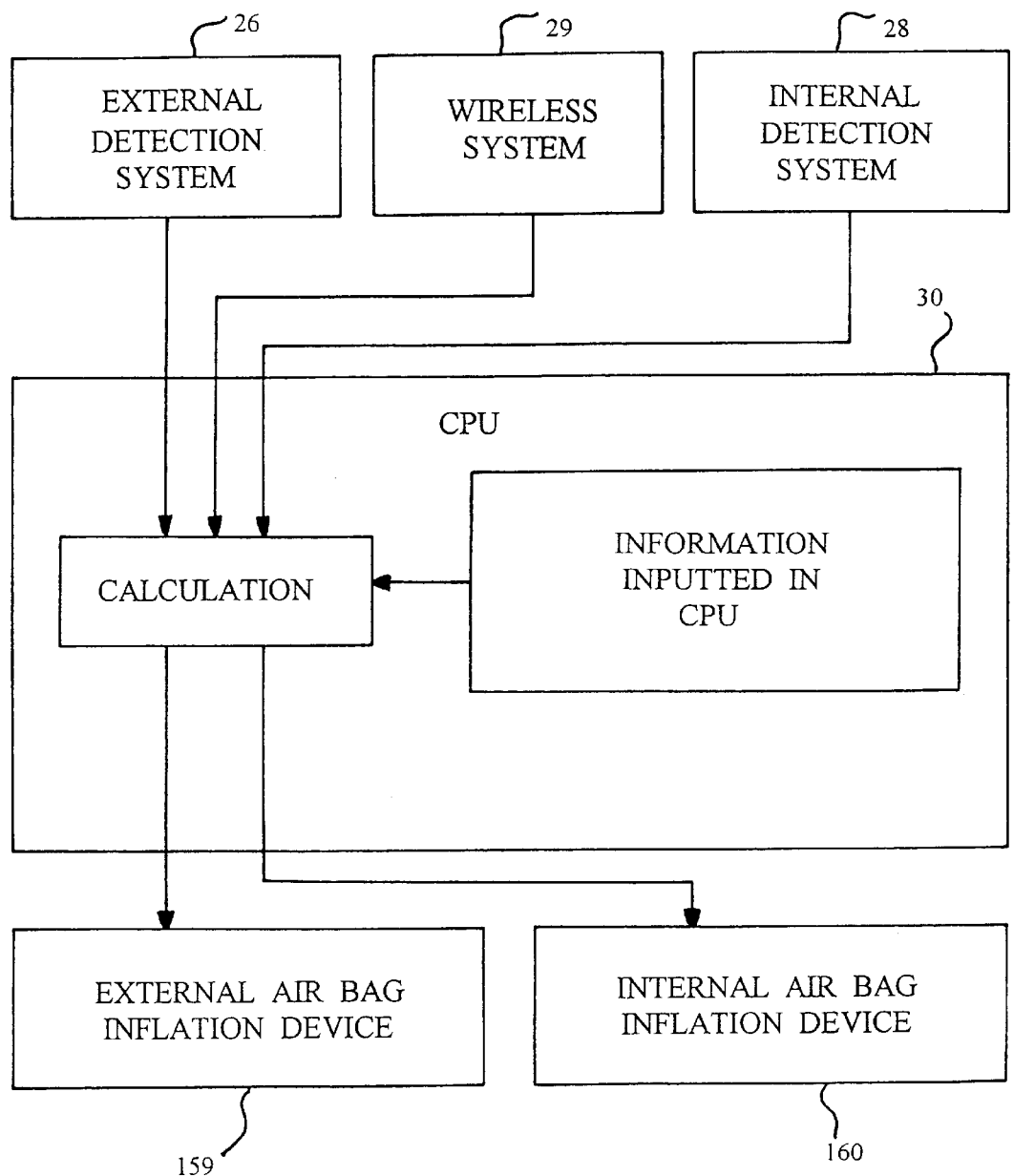
FIG. 1 is a block diagram of a preferred embodiment of an air bag system according to the present invention.

The air bag system may best be appreciated by referring to the block diagram shown in FIG. 1. As suggested by FIG. 1, the information obtained by the external detection system 26, the wireless system 29, and internal detection system 28 is transmitted to the CPU 30 for processing based on the information inputted in the CPU 30 to generate control signals. The control signals are then transmitted by conventional communication means to each related external air bag inflation device 159 and each related internal air bag inflation device 160 for controlling deployment, impact absorption, inflation size of the appropriate external air bags and internal air bags respectively, and then related external air bag and internal air bag must be inflated prior to collision as seen in FIG. 2.

The present invention anticipates the external detection system 26 being designed to incorporate any one of a variety of conventional radiant energy (electromagnetic spectrum) or sonic energy (ultrasonic, acoustic) technologies, each being capable of detecting information relating to the objects situated on the roadway. As illustrated, the external detection system 26 preferably includes a plurality of sensing devices.

For example as seen in FIG. 3;

A first sensing device 40 is installed in the roadway vehicle 12 for detecting information relating to the obstacles surrounding the roadway vehicle 12. The detected information is then transmitted by the first sensing device 40 to the CPU 30 for processing.

A second sensing device 42 is attached to a conventional roadside lamp post 46 positioned along the roadside for detecting information relating to the objects on the roadway from a position above the roadway 19. Information detected by the second sensing device 42 is transmitted to the CPU 30 by a wireless system to be discussed later in this disclosure.

A third sensing device 44 is installed in a conventional communication satellite 48 orbiting about the earth's atmosphere. The third sensing device 44 preferably incorporates a technology that may be developed in the future for detecting information relating to the objects positioned on the earth surface from a position located in the earth's atmosphere. Information detected by the third sensing device 44 is transmitted to the CPU 30 by the wireless system.

A fourth sensing device 45 is installed in a roadway obstacle 27 for detecting information relating to the roadway vehicle and the obstacles surrounding the roadway obstacle 27.

The present invention also requires a detectable coating material 165 that is capable of being easily detected by the external detection system 26. The detectable coating material 165 is required for an efficient execution of the external detection system 26. In distinguishing object there is another device called as the pattern recognition system. The pattern recognition system recognizes an object by comparing an information of the object detected by a sensor to the information stored in the CPU. If the object is slightly different from the information stored in the CPU, the pattern recognition system will recognize the object as the same item, even if it is not the same item. Therefore, the pattern recognition system is not acceptable to be used in the present invention because an error in identification could cause disastrous effects. Using the detectable coating material 165 together with the external detection system 26 allows for the present system to accurately distinguish if the object is able to inflict damage to the vehicle and/or injury to the passengers at collision. It also allows for the present system to accurately detect if the object should be protected from damage and to know if the roadway obstacle contains an external air bag inflation device 159. In order that the external detection system 26 functions accurately, the Government must dictate which objects are required to be coated with the detectable coating material 165. The object that is able to cause damage to a vehicle, injury to a vehicle's occupants. or be damaged by the vehicle at collision must be coated as shown in FIG. 3. Another detectable coating material 165 different from the material mentioned above needs to be selected for a coating on the external air bag inflation device 159 or on the surface of an outer portion where an external air bag inflation device is internally installed in a vehicle as shown in FIG. 3. These two kinds of coating materials need to be legalized for use as detectable coating material 165.

The wireless system 29 preferably includes a plurality of wireless apparatuses placed at a variety of locations on and surrounding the roadway vehicle 12 to transmit and receive information to and from the CPU 30.

As seen in FIG. 3, the first wireless apparatus 68 is installed in the roadway vehicle 12 for receiving information from a source such as the second wireless apparatus 70, the third wireless apparatus 72, or the fourth wireless apparatus 74 and transmitting the information to the CPU 30 on the roadway vehicle 12 for processing. The first wireless apparatus 68 also receives signal from the fourth sensing device 45 and transmits the information to the CPU 30 on the roadway vehicle 12 for an obtainment of the location of the roadway obstacle. Additionally the first wireless apparatus 68 receives information from the CPU 30 and transmits the information to the second wireless apparatus 70 installed on the roadway obstacle 27.

The third wireless apparatus 72 connected to the third sensing device 44 is installed on a communication satellite 48 in the atmosphere to receive information relating to a roadway situation detected by the third sensing device and transmit the information to the first wireless apparatus 68 of the roadway vehicle.

The fourth wireless apparatus 74 connected to the second sensing device 42 is attached to the top of a roadside lamp post 46 for transmitting information relating to a roadway situation detected by the second sensing device 42 to the first wireless apparatus 68 installed in the roadway vehicle 12.

Figure 4:
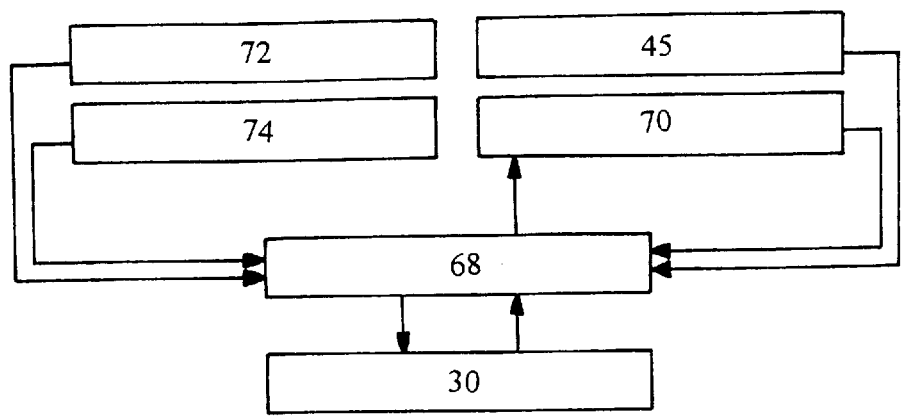
FIG. 4 is a block diagram of a preferred embodiment of the wireless system according to the present invention.

A representative block diagram of the wireless system 29 is shown in FIG. 4. According to a preferred embodiment of the present invention, the first wireless apparatus 68 receives information from the second wireless apparatus 70, the third wireless apparatus 72, the fourth wireless apparatus 74, and the fourth sensing device 45 then transmits the information to the CPU 30 for processing. The first wireless apparatus 68 also receives information transmitted by the CPU 30 and then transmits that information to the second wireless apparatus 70.

Figure 5:
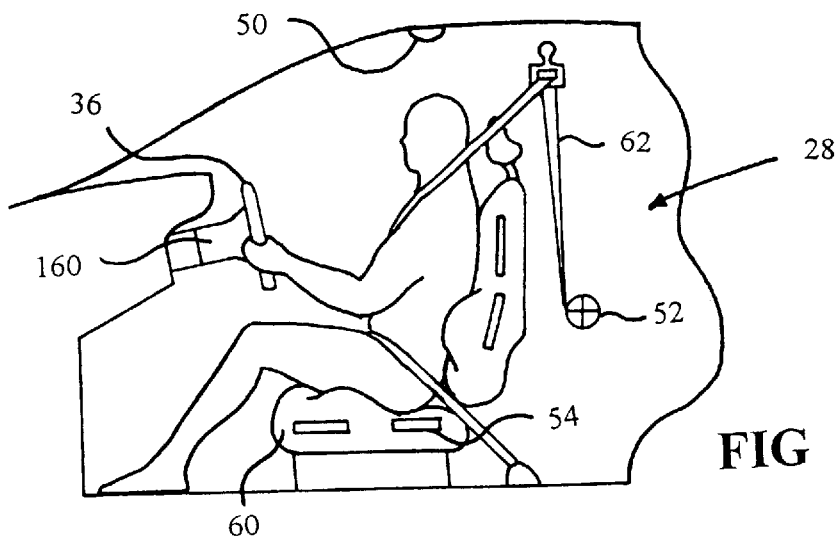
FIG. 5 is a first section of an internal detection system according to the present invention.
Figure 6:
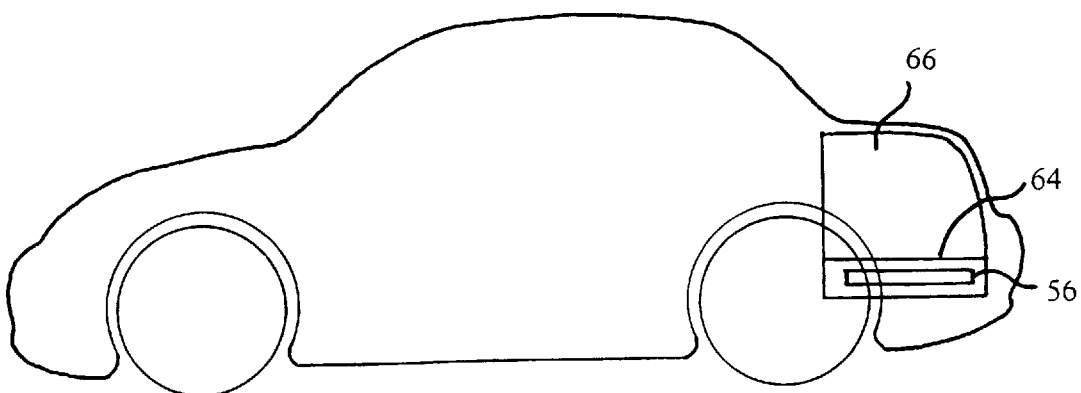
FIG. 6 is a second section of the internal detection system according to the present invention.

A preferred configuration of the internal detection system 28 may best be appreciated by referring to FIGS. 5 and 6. The internal detection system 28 includes a plurality of sensors (e.g., 50, 52, 54, 56) placed at a variety of locations inside of the roadway vehicle 12 for detecting various characteristics of the passengers situated inside of the roadway vehicle 12 (e.g., sitting posture, position, size of passengers, and weight of passengers and goods).

For example;

A first sensor 50 is installed inside of the automobile overlying the passengers' seat 60 of the roadway vehicle 12 for detecting size, location, posture, and position of the passengers. The first sensor 50 may incorporate conventional radiant energy electromagnetic spectrum), sonic energy (ultrasonic and acoustic), or camera technology to accomplish the stated functions.

A second sensor 52 is positioned behind the front seats of the roadway vehicle 12 for detecting information relating to the position of passengers seated in the roadway vehicle 12. The second sensor 52 preferably incorporates conventional technology to accomplish the stated function. According to a preferred embodiment of the invention, the second sensor 52 serves to detect passengers' posture, position, and size based on the number of times a seat belt 62 is wrapped around the second sensor 52.

At least a third sensor 54 is installed in the passengers' seat 60 for detecting various information relating to the passengers such as posture, size, position, weight, and location in the roadway vehicle 12 by means of sensing passengers' pressure. The third sensor 54 may incorporate conventional technology for accomplishing these functions.

At least a fourth sensor 56 is installed in the bottom portion 64 of the trunk 66 for detecting weight of the goods stored therein by means of sensing goods' pressure. The fourth sensor 56 may incorporate conventional technology for accomplishing this function.

To maximize the efficiency of the air bag 76, the air bag 76 must inflate completely prior to a collision. Thus the CPU 30 is programmed to control inflation size of the air bag 76. As seen in FIG. 2, the external air bag inflation device 159 is installed in the roadway vehicle 12 for enabling an external air bag to inflate outwardly from the inside of the roadway vehicle prior to a collision and serves to protect the automobile body 16 of the roadway vehicle 12, obstacles, passengers, and pedestrians in a collision situation. By contrast, the internal air bag inflation device 160 is installed in an internal section of the roadway vehicle 12 for releasing the internal air bag prior to a collision between the automobile body 16 and passengers in a collision situation. Thereby, the internal air bag serves to protect passengers from personal injuries and death caused by an automobile accident.

Figure 7:
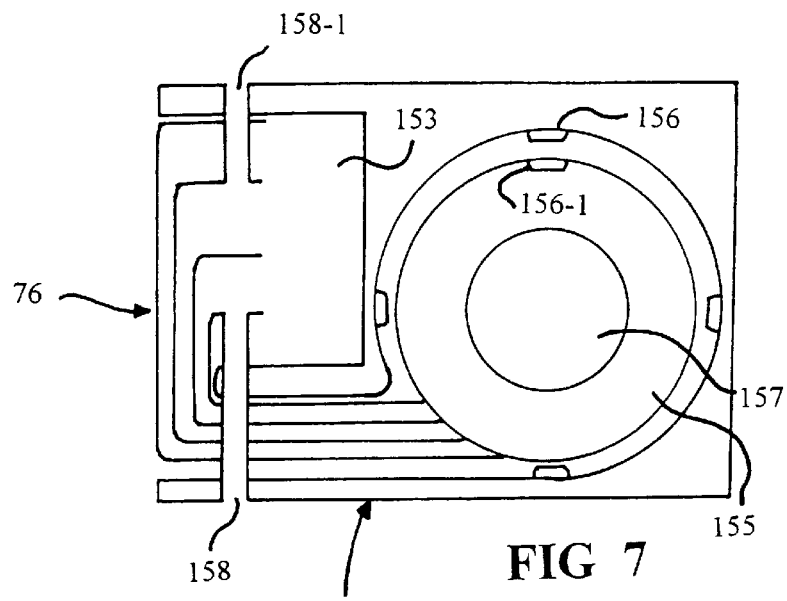
FIG. 7 is an illustration of an air bag inflation device right before inflation according to a preferred embodiment.
Figure 8:
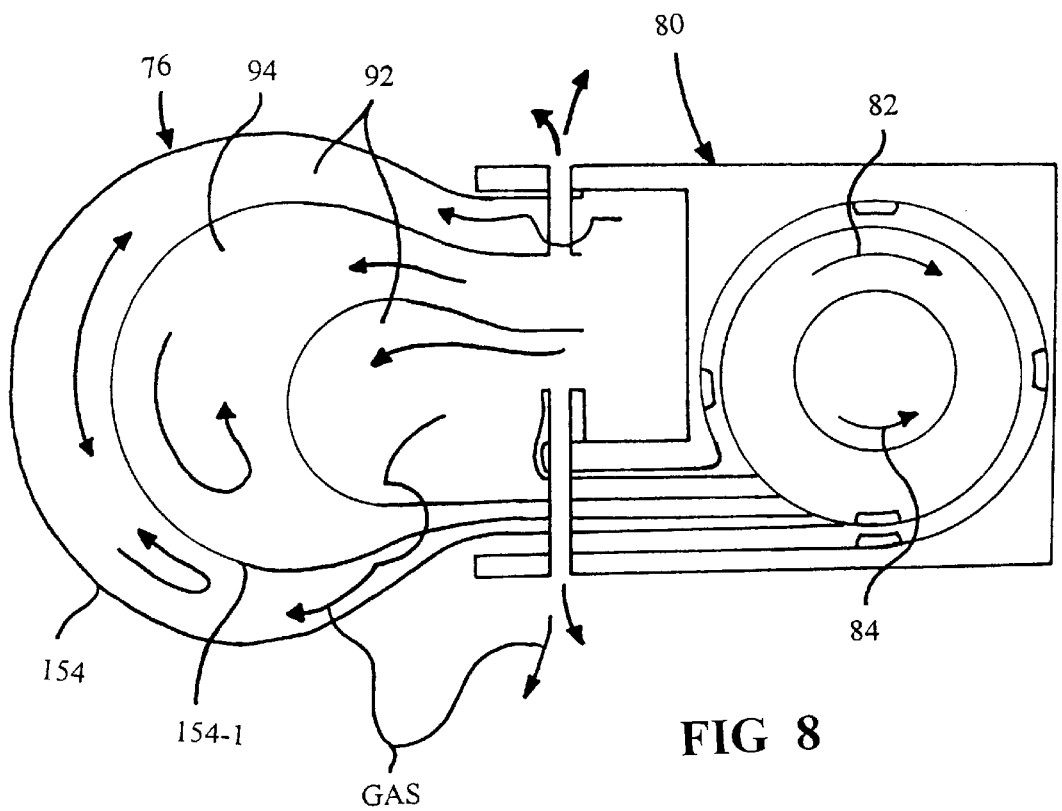
FIG. 8 is an illustration of an air bag inflation device during inflicting according to a preferred embodiment.
Figure 9:
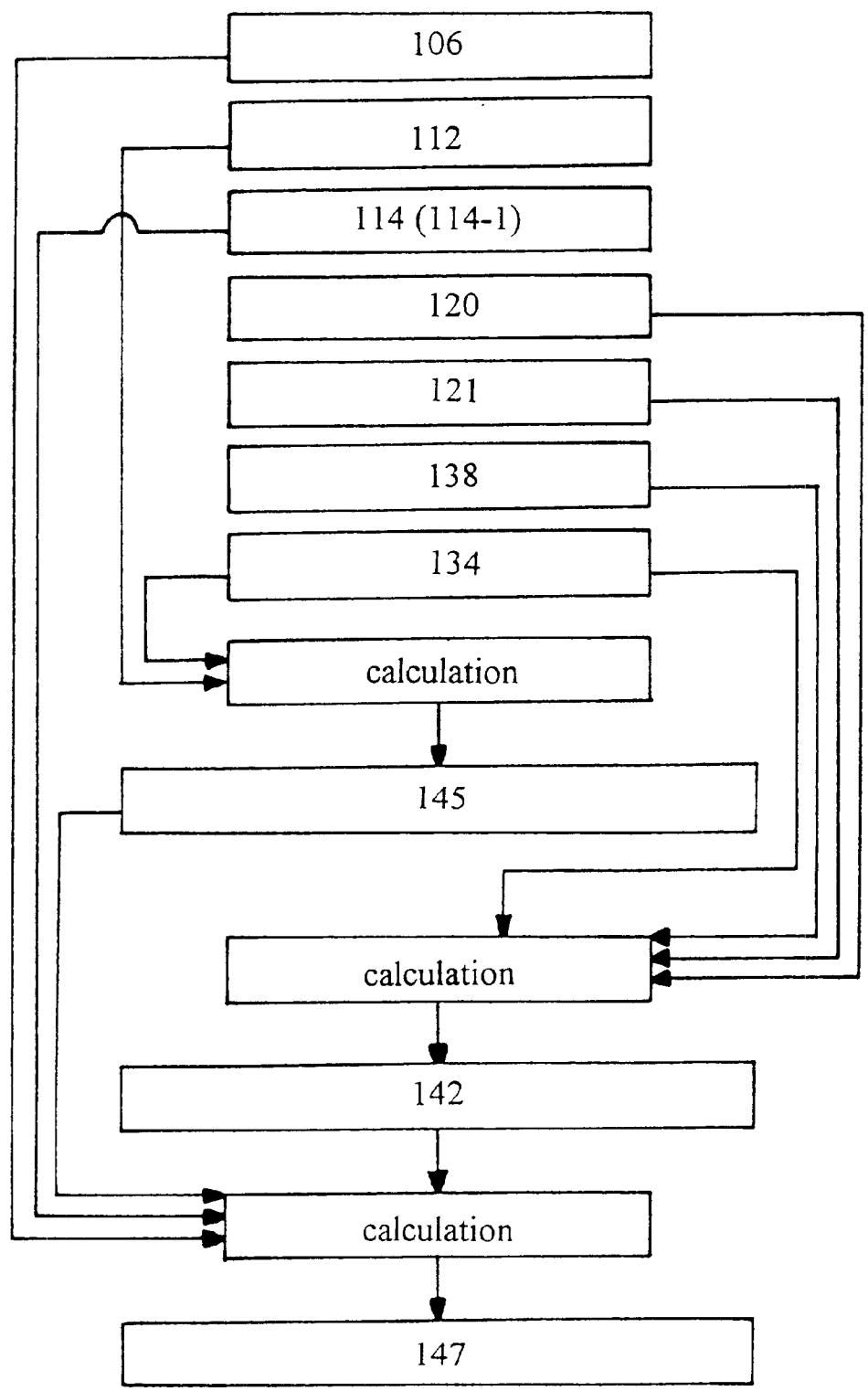
FIG. 9 is a flow chart of a preferred computer process for calculation of a criterion for inflation of an external air bag in an applicable zone of the roadway vehicle.

Further details relating to each of the aforementioned air bag inflation devices may be better understood by referring to the representative air bag inflation device 80 shown in FIGS. 7 and 8. FIG. 7 shows the state of the air bag inflation device 80 prior to inflation of an air bag 76 contained inside of the air bag inflation device 80. As shown, the air bag 76 is stored on a roller 155 in a wound up position inside of the air bag inflation device 80 until the air bag 76 is needed against a collision.

By contrast, FIG. 8 shows the shape of the air bag inflation device 80 when the air bag 76 is in a state of inflation. The air bag inflation device 80 comprises an inflator 153, a roller 155, a first roller sensor 156, a second roller sensor 156-1, a motor 157, a first absorption device 158, a second absorption device 158-1, and an air bag 76 having an external layer 154 and an internal layer 154-1.

The inflator 153 is a computer-controlled inflation device connected by conventional communication means to the CPU 30 for enabling the CPU 30 to control the operation of the inflator 153 for inflating the air bag 76. Upon receiving a command signal from the CPU 30, the inflator 153 is switched on by conventional computer-controlled switching means. The inflator 153 is connected by conventional means to both the external layer 154 and the internal layer 154-1 of the air bag for enabling the inflator 153 to inflate the external layer 154 and the internal layer 154-1.

The roller 155 is contained inside of the air bag inflation device 80 and rotatably attached thereto for enabling the roller 155 to be rotated inside the air bag inflation device 80. A first roller sensor 156 is attached to an inside surface of the air bag inflation device 80 while a second roller sensor 156-1 is attached to the outside surface of the roller 155 or providing a means incorporated with the first roller sensor by which the number of rotations of the roller 155 is detected. The information detected by the first roller sensor 156 and the second roller sensor 156-1 moving past each other during deployment is transmitted by conventional means to the CPU 30 for enabling the CPU 30 to calculate number of revolutions made by the roller 155 during the deployment. Using an attachment means, the air bag 76 is attached to the roller 155 for enabling the air bag 76 to be wound up around the roller 155, thereby retracting the air bag 76 inside of the air bag inflation device 80. The roller 155 is capable of being rotated in a first direction 82 for enabling the air bag 76 to be released from the roller 155.

The motor 157 is attached to the roller 155 to provide a means by which to rotatably drive the roller 155. The motor is designed to be electrically driven in a second direction 84 for the motor 157 to enable to oppose and stop the rotation of the roller 155 in the first direction 82. The motor 157 is a conventional motor designed to be controlled by the CPU 30. The CPU 30 is connected to the motor by conventional communications means for enabling the CPU 30 to control the operation of the motor 157. Accordingly, by using conventional control means, the motor 157, the first roller sensor 156, the second roller sensor 156-1, and CPU 30 are used in combination to control inflation size of the air bag 76 by controlling position of the roller 155.

The air bag 76 can be formed with a single layer or preferably formed with multi-layers. But in this description as a sample, external layer 154 and internal layer 154-1 that compose an air bag 76 will be described as seen in FIG. 8. The external layer 154 and the internal layer 154-1 aim at providing higher strength as compared to a conventional single layered air bag. The external layer 154 defines a substantially closed boundary to form a first air space 92 inside of the air bag to form a primary air cushion used to dampen a collision impact on the air bag 76. Preferably, the external layer 154 has the shape of a conventional air bag. The internal layer 154-1 defines a substantially closed boundary to form a secondary air space 94, thereby providing a means to further dampen a collision impact on the air bag 76.

A first absorption device 158 and a second absorption device 158-1, as relief valves controlled by the CPU 30, are connected to the external layer 154 and the internal layer 154-1 respectively to provide an absorption means for absorbing collision impact intensity by means of the gas leaking from the air bag 76 made by collision impact pressure at a collision.

According to the present invention, each of the aforementioned absorption devices incorporates conventional technology for enabling the applicable absorption device to be controlled by the CPU 30. The CPU 30 is programmed to set each absorption device (158, 158-1) according to a controlled opening size of the absorption device based on an anticipated impact intensity so that the air bag 76 becomes to absorb a collision impact by allowing the gas to leak.

Further details relating to a preferred computer process for controlling the air bag system 10 are now described. The present invention uses conventional control system technology in combination with the CPU 30 to control inflation of the air bag for protecting the roadway vehicle, roadway obstacle, pedestrians and passengers from a collision, wherein the algorithm used for the air bag system 10 is based on the physics relating to the roadway situations. A preferred computer process for calculating a criterion for inflation of an external air bag in an applicable zone of the roadway vehicle 147 is illustrated by the flow chart shown in FIG. 9. The criterion is calculated by performing the following steps:

1. calculation of an anticipated damage 142 based on following conditions:
    a. a moving speed of the roadway obstacle relative to the roadway vehicle 120 (referring to FIG. 33);
    b. a direction of motion of the roadway obstacle relative to the roadway vehicle 121 (referring to FIG. 33);
    c. a comparison of the nature of the roadway obstacle to the nature of the roadway vehicle 138 (referring to FIG. 25);
    d. an anticipated collision point 134 (referring to FIG. 19):
2. calculation of an external air bag inflation device in an applicable zone of the roadway vehicle 145 based on the anticipated collision point 134 and the information inputted into the CPU relating to the location of the external air bag inflation device on the roadway vehicle 112 (referring to FIG. 32):
3. calculation of a criterion for inflation of an external air bag in an applicable zone of the roadway vehicle 147 based on the following information:
    a. an external air bag inflation device in an applicable zone of the roadway vehicle 145;
    b. anticipated damage 142;
    c. a criterion for inflation of an external air bag on the roadway vehicle 106 (referring to FIG. 32); and
    d. a minimum allowable time window 114 (referring to FIG. 32) and a minimum allowable distance window 114-1 (referring to FIG. 30) for the roadway vehicle.

To maximize the efficiency of the external air bag, a complete inflation of the external air bag must be made before a collision within the period of the minimum allowable time (distance) window. Thus, the inflation size of the external air bag must be decided prior to its inflation. A preferred computer process for calculating an inflation size of an external air bag is illustrated by the flow chart shown in FIG. 10.

Figure 18:
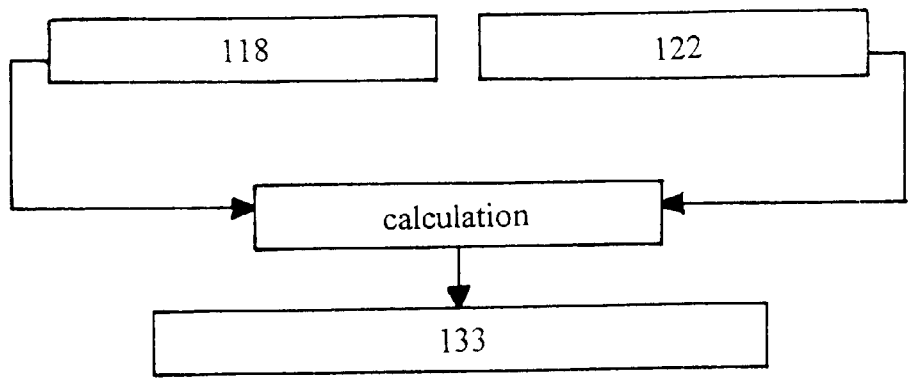
FIG. 18 is a flow chart of a preferred computer process for calculation of a moving location of the roadway obstacle relative to the roadway vehicle based on shapes of both the roadway vehicle and the roadway obstacle and the sizes of both the shapes.

First, an amount of space to be occupied by an inflated external air bag of the roadway vehicle 143 is calculated based on the following information:

1. an external air bag inflation device in an applicable zone of the roadway vehicle 145 (referring to FIG. 9);
2. minimum allowable time window for the roadway vehicle 114 (referring to FIG. 32);
3. minimum allowable distance window of the roadway vehicle 114-1 (referring to FIG. 30);
4. an estimated period of time in speed 115 that elapses between a point in time when a roadway obstacle is detected and a point in time when the roadway obstacle collides against an inflated external air bag of the roadway vehicle (referring to FIG. 32);
5. a distance 115-1 that covers from a detection point on the roadway obstacle when the roadway obstacle is detected by the external detection system to a point of impact between an inflated external air bag of the roadway vehicle and the roadway obstacle (referring to FIG. 31);
6. an anticipated collision point 134 (referring to FIG. 19);
7. a moving speed of the roadway obstacle relative to the roadway vehicle 120 (referring to FIG. 33); and
8. a moving location of the roadway obstacle relative to the roadway vehicle considering the shapes of the roadway vehicle and the roadway obstacle and the sizes of both the shapes 133 (referring to FIG. 18).

Second, the CPU 30 processes a calculation of an inflation size and shape of an external air bag in an applicable zone of the roadway vehicle 148 based on the following information:

1. When there is disaccord between an anticipated collision point and the location of an external air bag inflation device on the roadway obstacle 135:
    a. an external air bag inflation device in an applicable zone of the roadway vehicle 145 (referring to FIG. 9);
    b. a space to be occupied by an inflated external air bag of the roadway vehicle 143; and
    c. inflation sizes and shapes of an external air bag of the roadway vehicle based on various collision situations 107 (referring to FIG. 32):
2. When there is accord between an anticipated collision point and the location of an external air bag inflation device on the roadway obstacle 135-1, inflation size of an external air bag is calculated to be half the size of an inflated external air bag of the roadway vehicle based on disaccord with the following information:
    a. an external air bag inflation device in an applicable zone of the roadway vehicle 145 (referring to FIG. 9);
    b. a space to be occupied by an inflated external air bag of the roadway vehicle 143; and
    c. inflation sizes and shapes of the external air bag of the roadway vehicle based on various collision situations 107 (referring to FIG. 32).

Safety for the roadway vehicle, the roadway obstacle, pedestrian, and passengers in collision situation depends on the absorption capability of the external air bag in an inflated condition upon subjection to a collision impact. For maximum performance, the CPU 30 is programmed to calculate an absorption quantity of the external air bag based on an anticipated collision situation, in order for the CPU 30 to control the absorption device (valve or port) on the external layer of the air bag 158 and the absorption device (valve or port) on the internal layer of the air bag 158-1.

Figure 10:
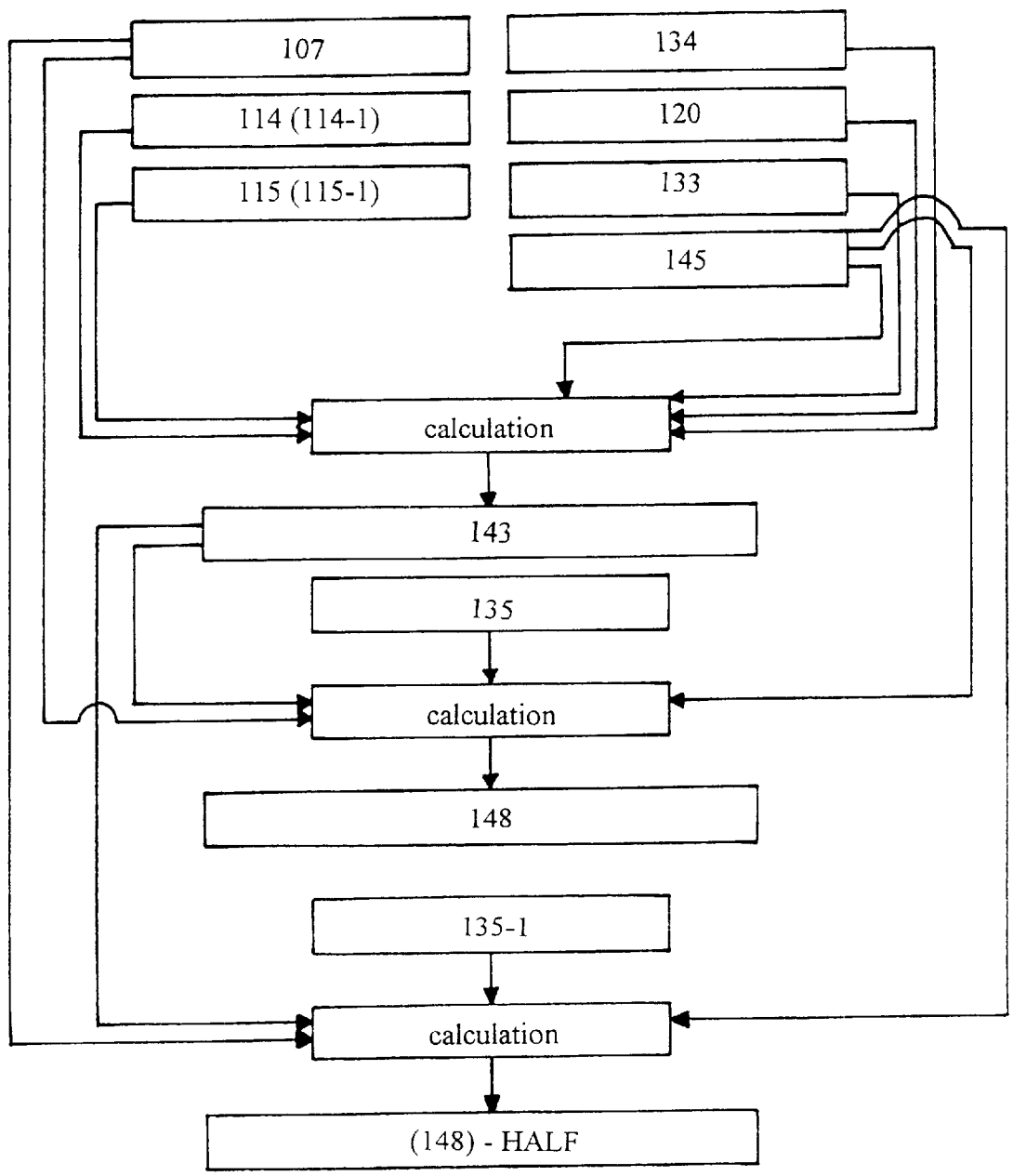
FIG. 10 is a flow chart of a preferred computer process for calculation of an inflation size and shape of an external air bag in an applicable zone of the roadway vehicle.
Figure 11:
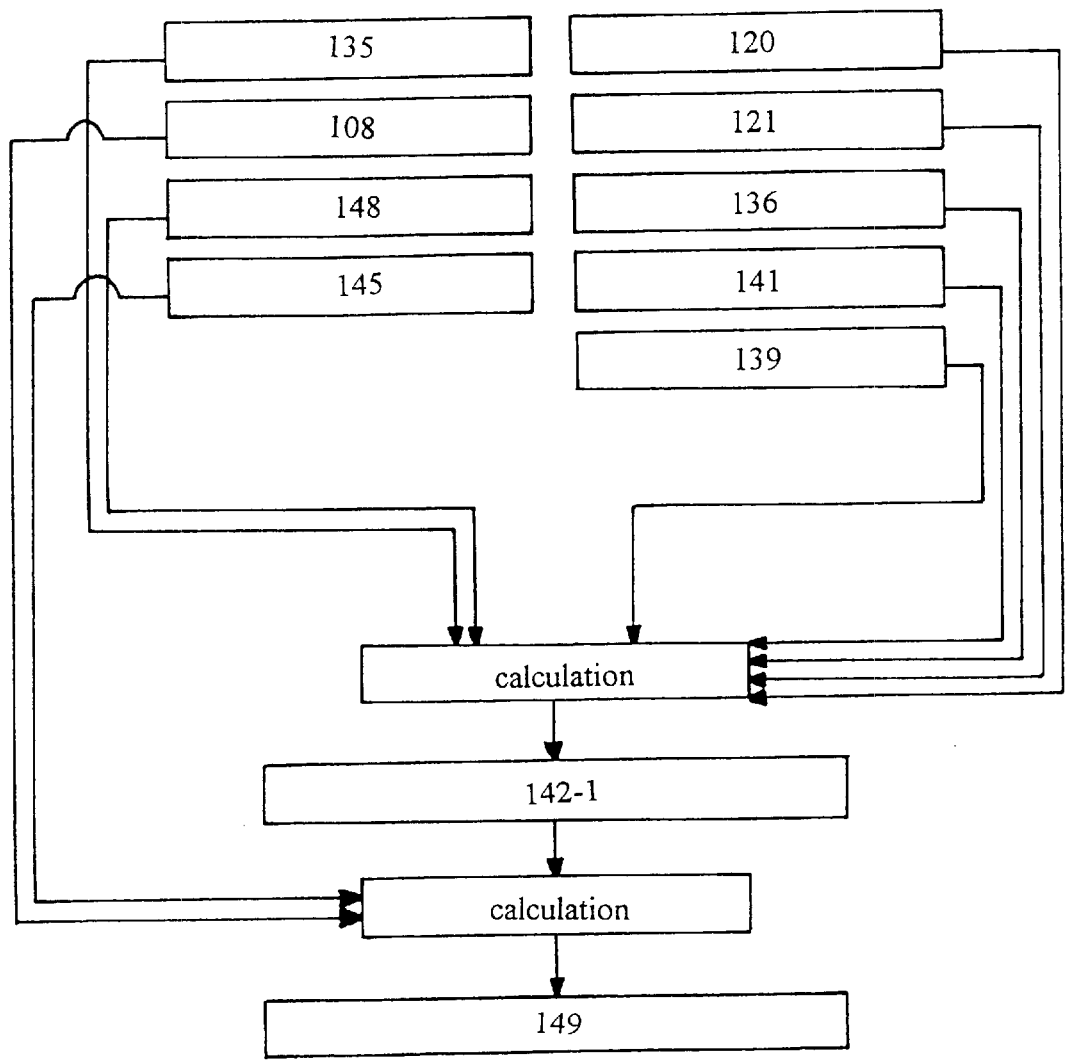
FIG. 11 is a flow chart of a preferred computer process for calculation of an absorption quantity of an external air bag in an applicable zone of the roadway vehicle based on disaccord between an anticipated collision point and the location of an external air bag inflation device of the roadway obstacle.

A preferred computer process for calculating an absorption quantity of an anticipated impact intensity is described below based on disaccord or accord between an anticipated collision point and the location of an external air bag inflation device on a roadway obstacle. The flow chart in FIG. 11 illustrates a preferred computer process for calculating an anticipated impact intensity 142-1 when disaccord 135 exists between an anticipated collision point and the location of an external air bag inflation device on the roadway obstacle. The CPU 30 calculates an anticipated impact intensity 142-1 based on the following information:

1. a moving speed of the roadway obstacle relative to the roadway vehicle 120 (referring to FIG. 33);
2. a direction of motion of the roadway obstacle relative to the roadway vehicle 121 (referring to FIG. 33);
3. an anticipated real collision point based on disaccord 136 (referring to FIG. 22);
4. a comparison of the weight of the roadway obstacle to the weight of the roadway vehicle 141 (referring to FIG. 28);
5. a comparison of the nature of the roadway obstacle to the nature of the external air bag of the roadway vehicle 139 (referring to FIG. 26); and 6. a calculation of an inflation size and shape of an external air bag in an applicable zone of the roadway vehicle 148 (referring to FIG. 10).

Figure 12:
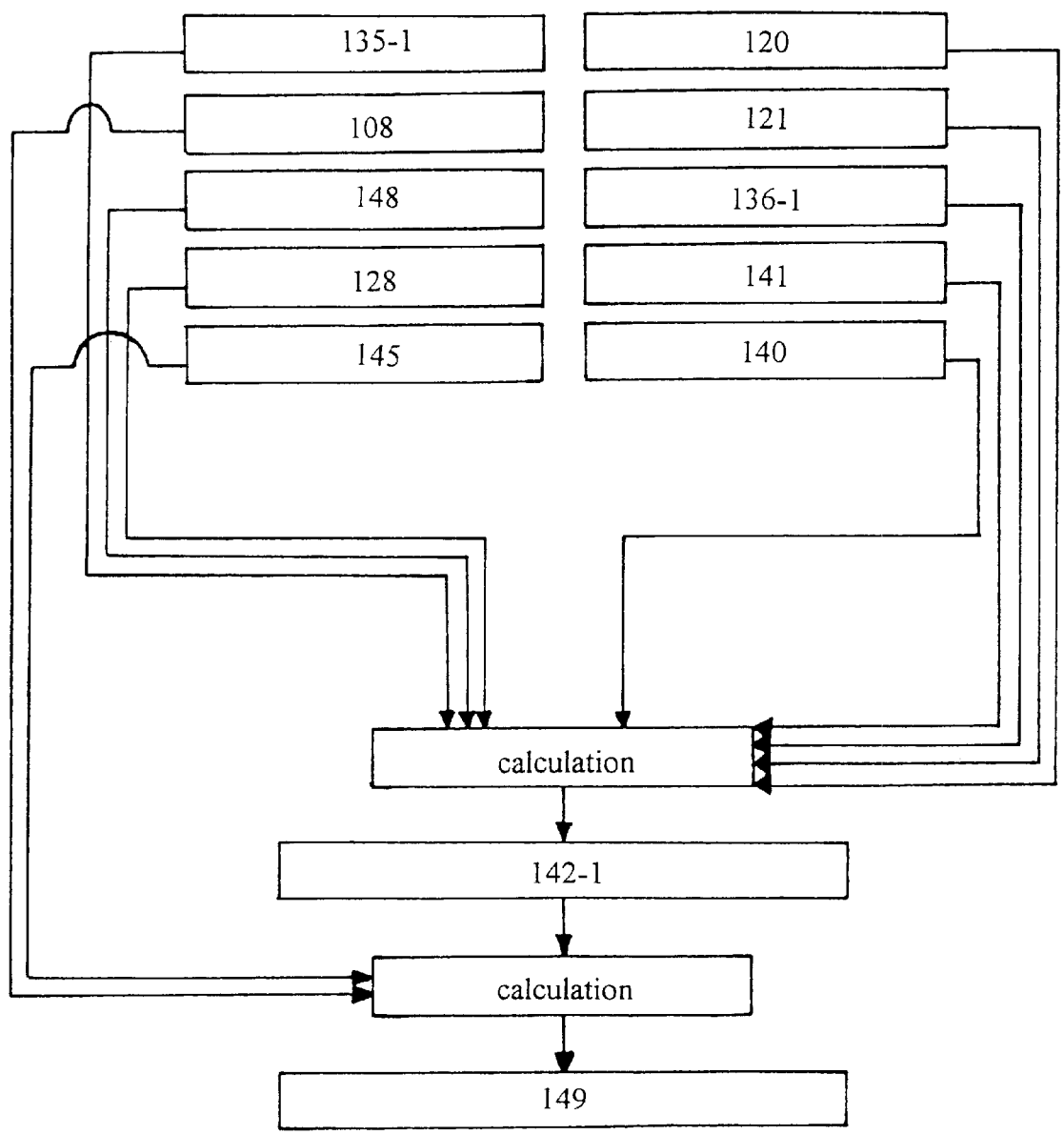
FIG. 12 is a flow chart of a preferred computer process for calculation of an absorption quantity of an external air bag in an applicable zone of the roadway vehicle based on accord between an anticipated collision point and the location of an external air bag inflation device of the roadway obstacle.

FIG. 12 shows a flow diagram illustrating a preferred computer process for calculating an anticipated impact intensity 142-1 when accord 135-1 exists between an anticipated collision point and the location of an external air bag inflation device on the roadway obstacle. When accord 135-1 is found, the CPU 30 calculates an anticipated impact intensity 142-1 based on the following information:

1. a moving speed of the roadway obstacle relative to the roadway vehicle 120 (referring to FIG. 33);
2. a direction of motion of the roadway obstacle relative to the roadway vehicle 121 (referring to FIG. 33);
3. an anticipated real collision point based on accord 136-1 (referring to FIG. 23);
4. a comparison of the weight of the roadway obstacle to the weight of the roadway vehicle 141 (referring to FIG. 28);
5. a comparison of the nature of the external air bag of the roadway obstacle to the nature of the external air bag of the roadway vehicle 140 (referring to FIG. 27);
6. a calculation of an inflation size and shape of an external air bag in an applicable zone of the roadway vehicle 148 (referring to FIG. 10); and
7. an inflation size and shape of an external air bag in an applicable zone of the roadway obstacle 128.

A calculation of an absorption quantity for the external air bag in an applicable zone of the roadway vehicle 149 is based on the following information as seen in FIG. 11 and FIG. 12:

1. an external air bag inflation device in an applicable zone of the roadway vehicle 145 (referring to FIG. 9);
2. an anticipated impact intensity 142-1; and
3. absorption quantities of an external air bag of the roadway vehicle in conformity with impact intensity 108 (referring to FIG. 32).

A calculation of an inflation size and shape of an external air bag in an applicable zone of the roadway obstacle 128 is made when accord is found through one of the following two procedures:

1. CPU 30 determines an inflation size of external air bag of the roadway obstacle to be half the size of the external air bag of the roadway vehicle at disaccord; or
2. the inflation size of an external air bag in an applicable zone of the roadway obstacle may be obtained by the wireless system 29.

A preferred computer process for calculation of a criterion for inflation of an internal air bag according to the present invention is now described. A preferred computer process for calculating an anticipated damage 142-2 when disaccord 135 is found between an anticipated collision point and the location of an external air bag inflation device on the roadway obstacle is illustrated by the flow chart shown in FIG. 13. The anticipated damage 142-2 is calculated based on the following information:

1. a moving speed of the roadway obstacle relative to the roadway vehicle 120 (referring to FIG. 33);
2. a direction of motion of the roadway obstacle relative to the roadway vehicle 121 (referring to FIG. 33);
3. an anticipated real collision point based on disaccord 136 (referring to FIG. 22);
4. a comparison of the weight of the roadway obstacle to the weight of the roadway vehicle 141 (referring to FIG. 28);
5. a comparison of the nature of the roadway obstacle to the nature of the external air bag on the roadway vehicle 139 (referring to FIG. 26);
6. a calculation of an inflation size and shape of an external air bag in an applicable zone of the roadway vehicle 148 (referring to FIG. 10); and
7. a calculation of an absorption quantity of an external air bag in an applicable zone of the roadway vehicle 149 (referring to FIG. 11).

Figure 14:
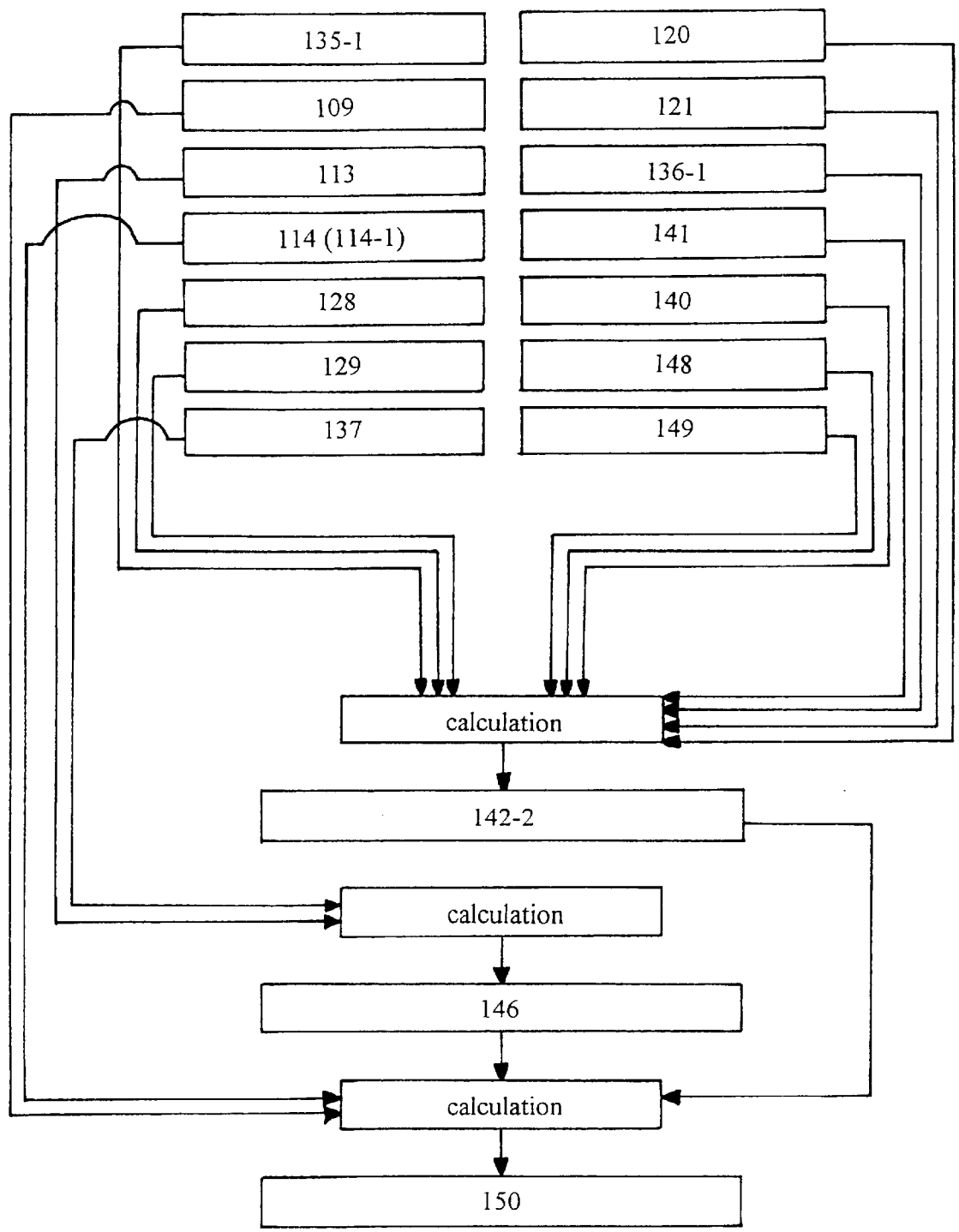
FIG. 14 is a flow chart of a preferred computer process for calculation of a criterion for inflation of an internal air bag in an applicable zone of the roadway vehicle based on accord between an anticipated collision point and the location of an external air bag inflation device of the roadway obstacle.

A preferred computer process for calculating an anticipated damage 142-2 when accord 135-1 is found between an anticipated collision point and the location of an external air bag inflation device on the roadway obstacle is illustrated by a flow chart shown in FIG. 14. When accord 135-1 is found, the anticipated damage 142-2 is calculated based on the following information:

1. a moving speed of the roadway obstacle relative to the roadway vehicle 120 (referring to FIG. 33);
2. a direction of motion of the roadway obstacle relative to the roadway vehicle 121 (referring to FIG. 33);
3. an anticipated real collision point based on accord 136-1 (referring to FIG. 23);
4. a comparison of the weight of the roadway obstacle to the weight of the roadway vehicle 141 (referring to FIG. 28);
5. a comparison of the nature of an external air bag on the roadway obstacle to the nature of an external air bag on the roadway vehicle 140 (referring to FIG. 27);
6. a calculation of an inflation size and shape of an external air bag in an applicable zone of the roadway vehicle 148 (referring to FIG. 10);
7. a calculation of an absorption quantity of an external air bag in an applicable zone of the roadway vehicle 149 (referring to FIG. 12);
8. an inflation size and shape of an external air bag in an applicable zone of the roadway obstacle 128; and
9. an absorption quantity of an external air bag in an applicable zone of the roadway obstacle 129 (referring to FIG. 34).

Figure 13:
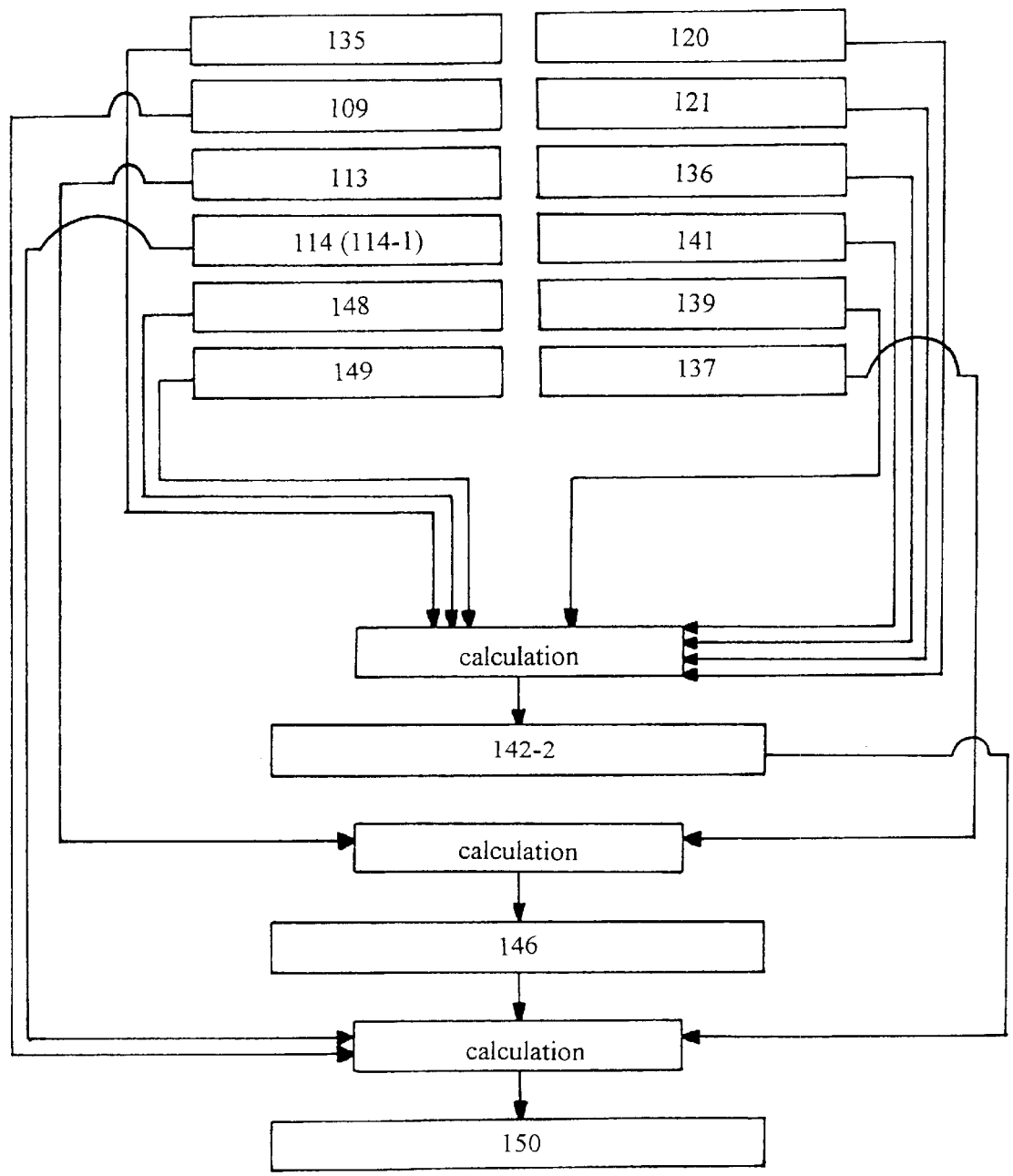
FIG. 13 is a flow chart of a preferred computer process for calculation of a criterion for inflation of an internal air bag in an applicable zone of the roadway vehicle based on disaccord between an anticipated collision point and the location of an external air bag inflation device of the roadway obstacle.
Figure 30:
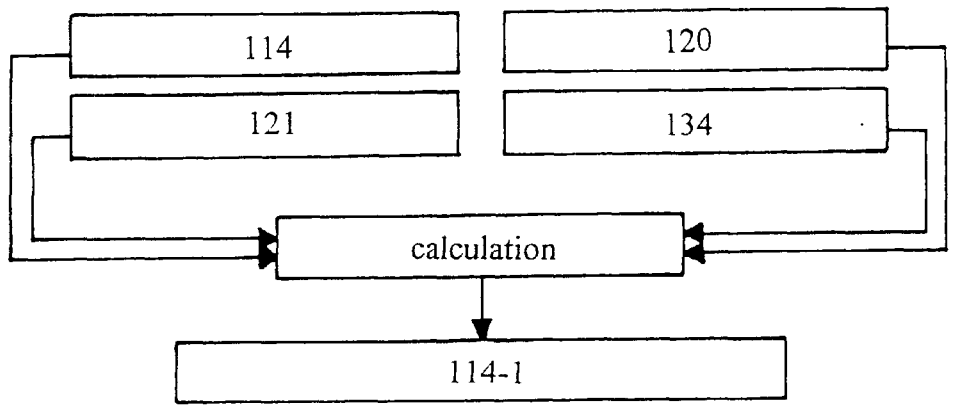
FIG. 30 is a flow chart of a preferred computer process for calculation of a minimum allowable distance window.

Next, a criterion for inflation of an internal air bag in an applicable zone of the roadway vehicle 150 is calculated based on the following information as seen in FIG. 13 and FIG. 14:

1. an internal air bag inflation device in an applicable zone of the roadway vehicle 146, which is calculated based on an anticipated collision point inside of the roadway vehicle 137 (referring to FIG. 24) and location of each internal air bag inflation device of the roadway vehicle 113 (referring to FIG. 32);
2. an anticipated damage 142-2;
3. a criterion for an estimated injury inflicted to passengers from a collision 109 (referring to FIG. 32)
4. a minimum allowable time window for the roadway vehicle 114 (referring to FIG. 32); and
5. a minimum allowable distance window for the roadway vehicle 114-1 (referring to FIG. 30).

Thereafter, the inflation size and shape of an external air bag in an applicable zone of the roadway obstacle 128 is made based on one of the following methods when accord is found between an anticipated collision point and the location of an external air bag of the roadway obstacle:

1. Calculate an inflation size of an external air bag of the roadway obstacle to be half the size of an external air bag of the roadway vehicle where disaccord exists; or 2. the inflation size of an external air bag of the roadway obstacle may be obtained by the wireless system 29.

The present invention anticipates a possibility of injury to be inflicted to passengers when the internal air bag inflates. To avoid the severity of such injury, the passengers need to keep their sitting positions as farther as possible from the internal air bag inflation device 160, but it is unreasonable to expect that the passengers will always sit as far from the internal air bag inflation device 160 without moving. That is, passengers are always apt to be movable and get close to the internal air bag inflation device 160 when a collision occurs. To avoid such dangerous situation, inflation size of the internal air bag must be controlled for protection of the passengers.

Figure 15:
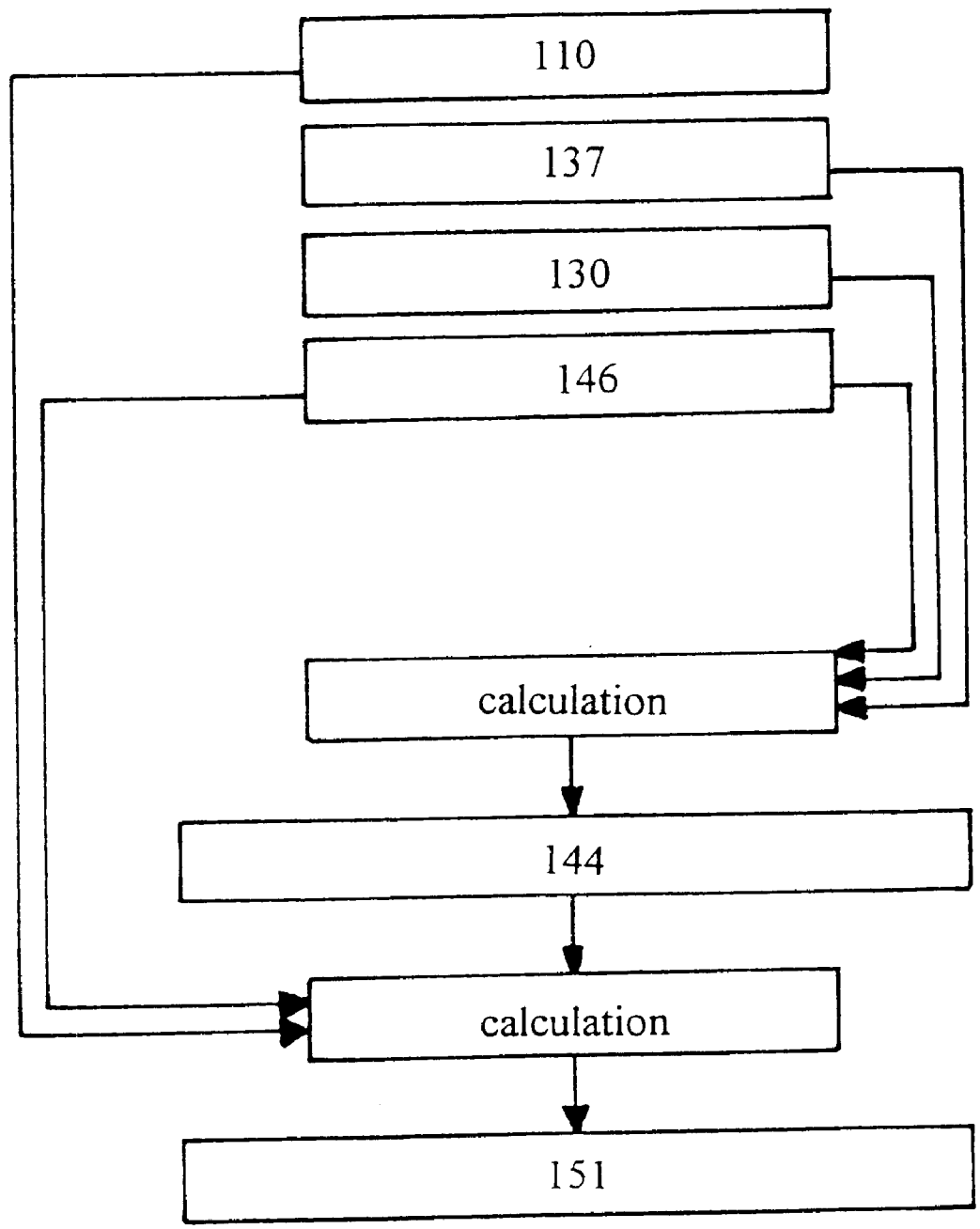
FIG. 15 is a flow chart of a preferred computer process for calculation of an inflation size and shape of an internal air bag in an applicable zone of the roadway vehicle.

A preferred computer process for calculating an inflation size of the internal air bag according to the present invention may best be appreciated by referring to the flow chart shown in FIG. 15. The volume of space to be occupied by an inflated internal air bag of the roadway vehicle 144 is calculated based on the following information:

1. an anticipated collision point inside of the roadway vehicle 137 (referring to FIG. 24);
2. position, posture, and size of passengers 130(referring to FIG. 35); and
3. an internal air bag inflation device in an applicable zone of the roadway vehicle 146 (referring to FIG. 14).

The CPU 30 then processes for a calculation of an inflation size and shape of an internal air bag in an applicable zone of the roadway vehicle 151 based on the following information:

1. an internal air bag inflation device in an applicable zone of the roadway vehicle 146;
2. a volume of space to be occupied by the inflated internal air bag of the roadway vehicle 144; and
3. an inflation size and shape of an internal air bag of the roadway vehicle 110 (referring to FIG. 32).

The efficiency of an internal air bag for minimizing injuries to passengers at collision in spite of the use of an external air bag depends on absorption capability of the internal air bag for the impact intensity. According to the present invention, the CPU 30 is programmed to calculate an absorption quantity of the internal air bag based on an anticipated collision situation for controlling the absorption device (valve or port) on the external layer of the air bag 158 and absorption device (valve or port) on the internal layer of the air bag 158-1.

A preferred computer process for calculating an absorption quantity of an internal air bag according to the anticipated collision situation for maximizing the efficiency of the internal air bag is now described. The first step is the CPU 30 to determine whether accord 135-1 or disaccord 135 exists between an anticipated collision point and the location of the external air bag inflation device on the roadway obstacle. If disaccord 135 is found, an anticipated impact intensity 142-3 is calculated as the flow chart shown in FIG. 16 based on the following information:

1. a moving speed of the roadway obstacle relative to the roadway vehicle 120 (referring to FIG. 33);
2. a direction of motion of the roadway obstacle relative to the roadway vehicle 121 (referring to FIG. 33);
3. an anticipated real collision point based on disaccord 136 (referring to FIG. 22);
4. a comparison of the weight of the roadway obstacle to the weight of the roadway vehicle 141 (referring to FIG. 28);
5. a comparison of the nature of the roadway obstacle to the nature of an external air bag of the roadway vehicle 139 (referring to FIG. 26);
6. a calculation of an inflation size and shape of an external air bag in an applicable zone of the roadway vehicle 148 (referring to FIG. 10);
7. a calculation of an absorption quantity of an external air bag in an applicable zone of the roadway vehicle 149 (referring to FIG. 11);
8. position, posture, and size of passengers inside of the roadway vehicle 130 (referring to FIG. 35); and
9. weight of passengers 131 (referring to FIG. 35).

Figure 17:
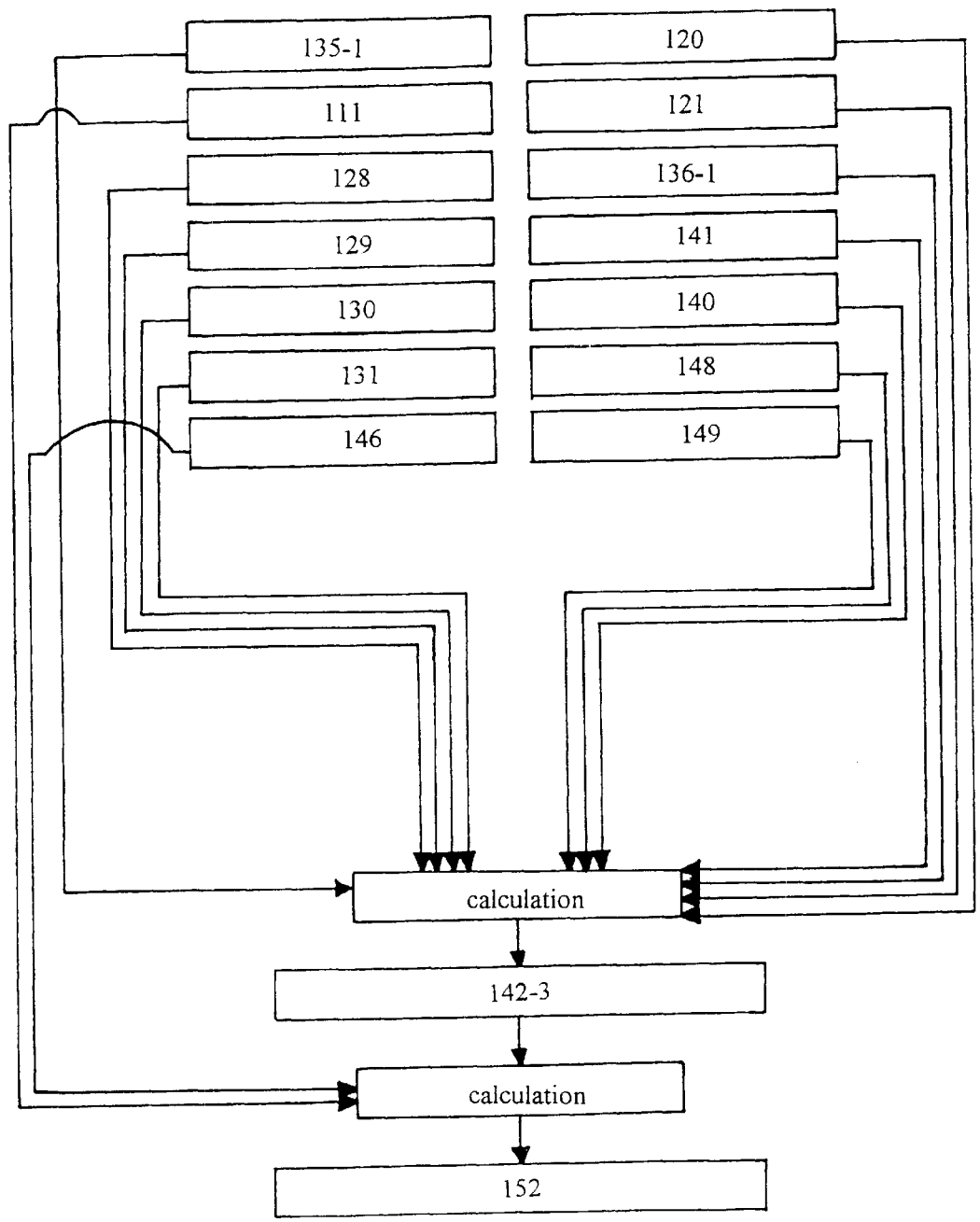
FIG. 17 is a flow chart of a preferred computer process for calculation of an absorption quantity of an internal air bag in an applicable zone of the roadway vehicle based on accord.

If accord 135-1 is found, an anticipated impact intensity 142-3 is calculated by the CPU as the flow chart shown in FIG. 17, based on the following information:

1. a moving speed of the roadway obstacle relative to the roadway vehicle 120 (referring to FIG. 33);
2. a direction of motion of the roadway obstacle relative to the roadway vehicle 121 (referring to FIG. 33);
3. an anticipated real collision point based on accord 136-1 (referring to FIG. 23);
4. a comparison of the weight of the roadway obstacle to the weight of the roadway vehicle 141 (referring to FIG. 28);
5. a comparison of the nature of an external air bag of the roadway obstacle to the nature of an external air bag of the roadway vehicle 140 (referring to FIG. 27);
6. a calculation of an inflation size and shape of an external air bag in an applicable zone of the roadway vehicle 148 (referring to FIG. 10);
7. a calculation of an absorption quantity of an external air bag in an applicable zone of the roadway vehicle 149 (referring to FIG. 12);
8. an inflation size and shape of an external air bag in an applicable zone of the roadway obstacle 128;
9. an absorption quantity of an external air bag in an applicable zone of the roadway obstacle 129 (referring to FIG. 34);
10. position, posture, and size of passengers inside of the roadway vehicle 130 (referring to FIG. 35); and
11. weight of passengers 131 (referring to FIG. 35).

Figure 16:
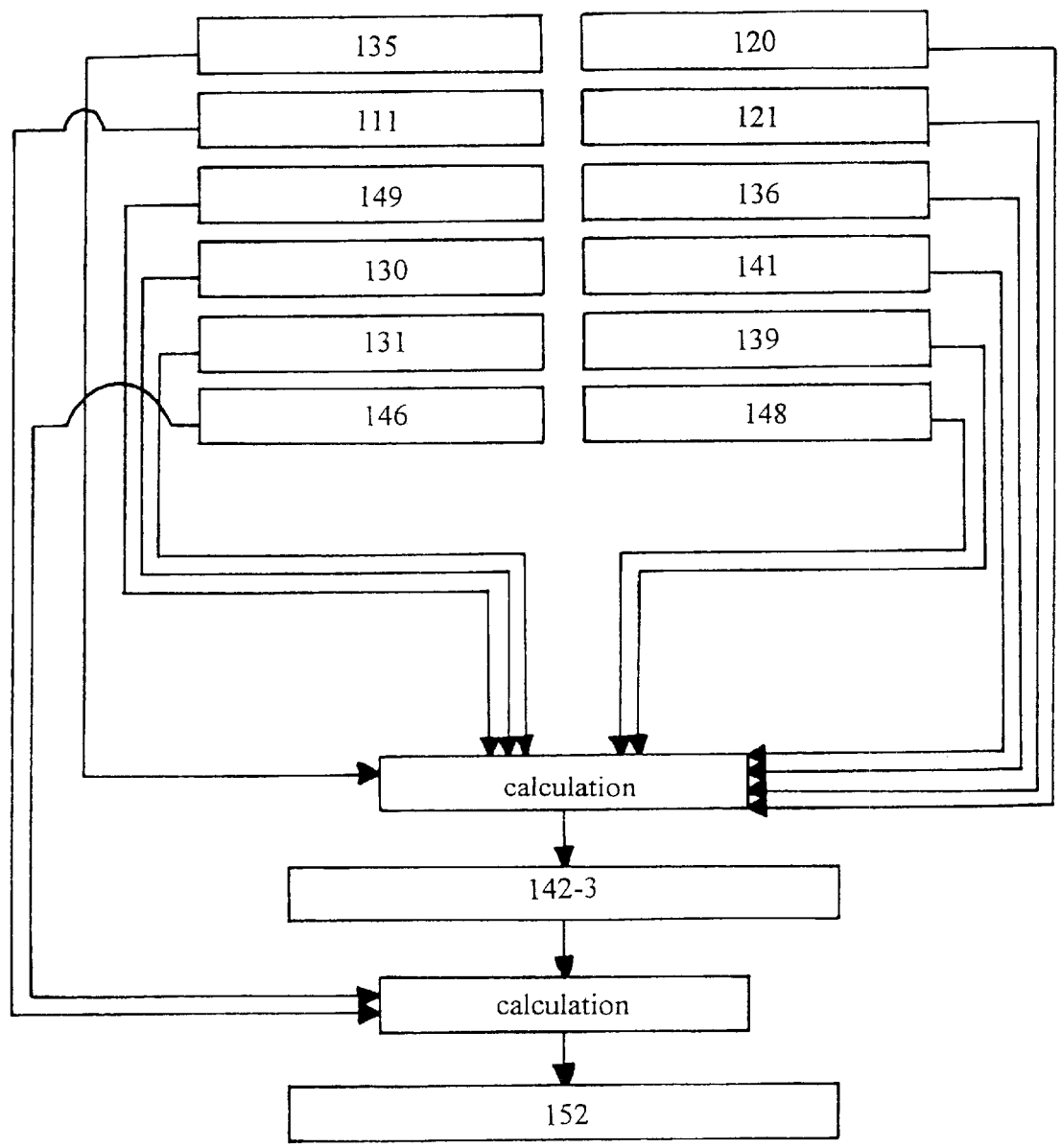
FIG. 16 is a flow chart of a preferred computer process for calculation of an absorption quantity of an internal air bag in an applicable zone of the roadway vehicle based on disaccord.

Preferably, as seen in FIG. 16 and FIG. 17, a calculation of an absorption quantity of an internal air bag in an applicable zone of the roadway vehicle 152 is processed based on the following information:

1. an internal air bag inflation device in an applicable zone of the roadway vehicle 146 (referring to FIG. 13 and FIG. 14);
2. an anticipated impact intensity 142-3; and
3. an absorption quantities of an internal air bag of the roadway vehicle 111 (referring to FIG. 32).

An inflation size and shape of an external air bag in an applicable zone of the roadway obstacle 128 is made by one of the two procedures in the following when accord 135-1 is found. The first procedure is to calculate an inflation size of an external air bag of the roadway obstacle to be half the size of an external air bag of the roadway vehicle based on disaccord. Alternatively, the second procedure is to obtain an inflation size of an external air bag in an applicable zone of the roadway obstacle via the wireless system 29.

A preferred computer process for calculating various information according to the present invention is now described. FIG. 18 shows a flow chart of a preferred computer process for calculating a moving location of the roadway obstacle relative to the roadway vehicle considering the shapes of the roadway vehicle and the roadway obstacle and the sizes of both the shapes 133. The information 133 is calculated based on the information of a moving location of the roadway obstacle relative to the first sensing device on the roadway vehicle considering shape of the roadway obstacle and size of the shape 122 (referring to FIG. 33) and shape of the roadway vehicle and size of the shape 118 (referring to FIG. 32).

Figure 19:
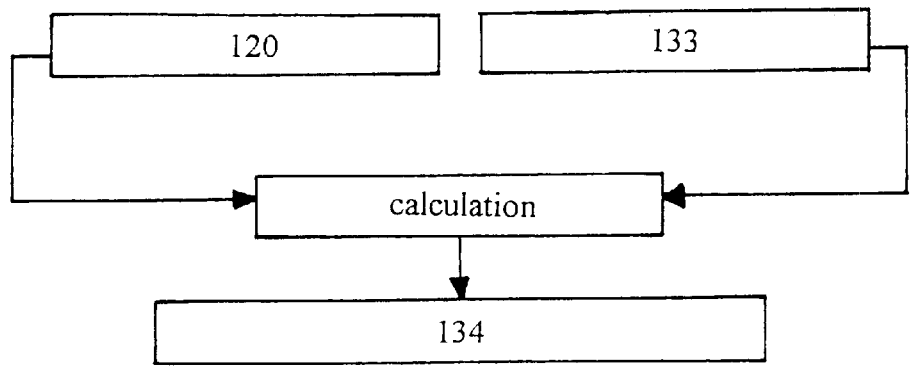
FIG. 19 is a flow chart of a preferred computer process for calculation of an anticipated collision point.

A preferred computer process for calculating an anticipated collision point 134 according to the present invention is understood by referring to FIG. 19. The anticipated collision point 134 is calculated based on the information of a moving speed of the roadway obstacle relative to the roadway vehicle 120 (referring to FIG. 33) and the information of a moving location of the roadway obstacle relative to the roadway vehicle considering shapes of the roadway vehicle and the roadway obstacle and sizes of both the shapes 133 (referring to FIG. 18 and FIG. 33).

Figure 20:
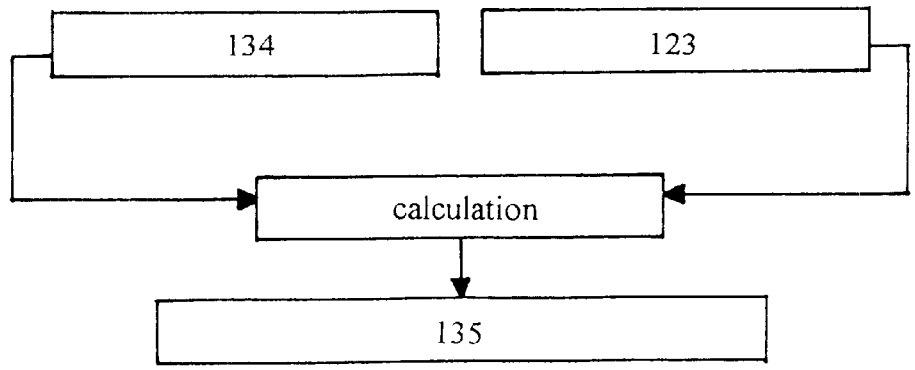
FIG. 20 is a flow chart of a preferred computer process for calculation of disaccord between an anticipated collision point and the location of an external air bag inflation device of the roadway obstacle.

A preferred computer process for calculating disaccord between an anticipated collision point and the location of an external air bag inflation device on the roadway obstacle 135 may best be understood by referring to the flow chart shown in FIG. 20. The information 135 is calculated by the CPU 30 based on the information of an anticipated collision point 134 (referring to FIG. 19) and the location of an external air bag inflation device on the roadway obstacle 123 (referring to FIG. 33 and FIG. 34).

Figure 21:
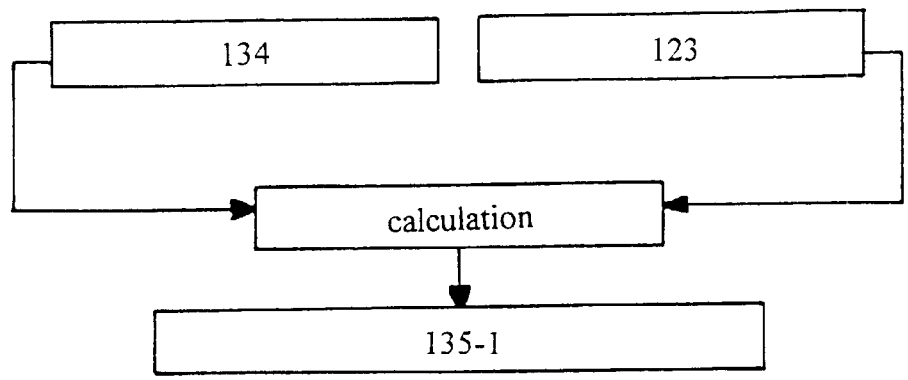
FIG. 21 is a flow chart of a preferred computer process for calculation of accord between an anticipated collision point and the location of an external air bag inflation device of the roadway obstacle.

Alternatively, a preferred computer process for calculating accord between an anticipated collision point and the location of an external air bag inflation device on the roadway obstacle 135-1 is shown in FIG. 21. The information 135-1 is calculated by the CPU 30 based on the information of an anticipated collision point 134 (referring to FIG. 19) and the location of an external air bag inflation device on the roadway obstacle 123 (referring to FIG. 33 and FIG. 34).

Figure 22:
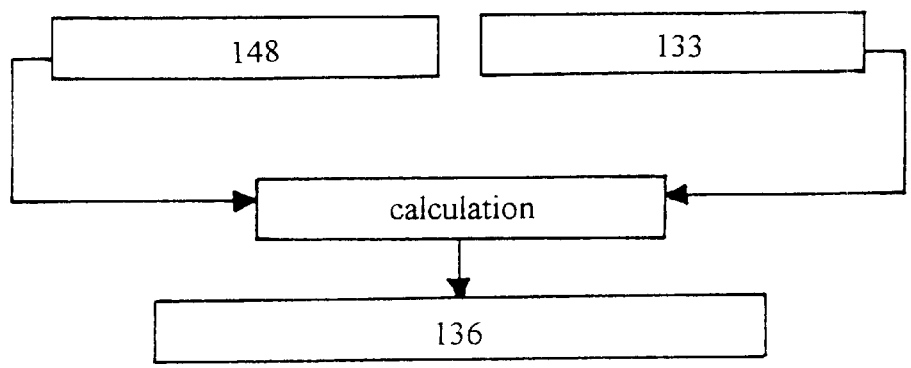
FIG. 22 is a flow chart of a preferred computer process for calculation of an anticipated real collision point based on disaccord.

A preferred computer process for calculating an anticipated real collision point based on disaccord 136 may best be understood by referring to the flow chart shown in FIG. 22. The information 136 is obtained based on the calculation of an inflation size and shape of an external air bag in an applicable zone of the roadway vehicle 148 (referring to FIG. 10) and a moving location of the roadway obstacle relative to the roadway vehicle considering shapes of the roadway vehicle and the roadway obstacle and sizes of both the shapes 133 (referring to FIG. 18).

Figure 23:
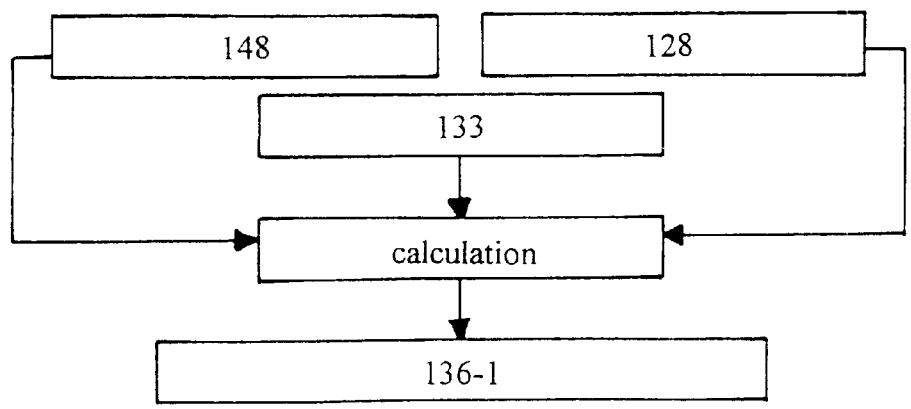
FIG. 23 is a flow chart of a preferred computer process for calculation of an anticipated real collision point based on accord.

A preferred computer process for calculating an anticipated real collision point based on accord 136-1 may best be understood by referring to the flow chart shown in FIG. 23. The information 136-1 is obtained based on the calculation of an inflation size and shape of an external air bag in an applicable zone of the roadway vehicle 148 (referring to FIG. 10), an inflation size and shape of an external air bag in an applicable zone of the roadway obstacle 128, and a moving location of the roadway obstacle relative to the roadway vehicle considering shapes of the roadway vehicle and the roadway obstacle and sizes of both the shapes 133 (referring to FIG. 18). The above 128 is made by one of the following two procedures when accord is found. The first procedure is to calculate an inflation size of an external air bag of the roadway obstacle to be half the size of an external air bag of the roadway vehicle based on disaccord. Alternatively, the second procedure is to obtain an inflation size of an external air bag of the roadway obstacle via the wireless system 29.

Figure 24:
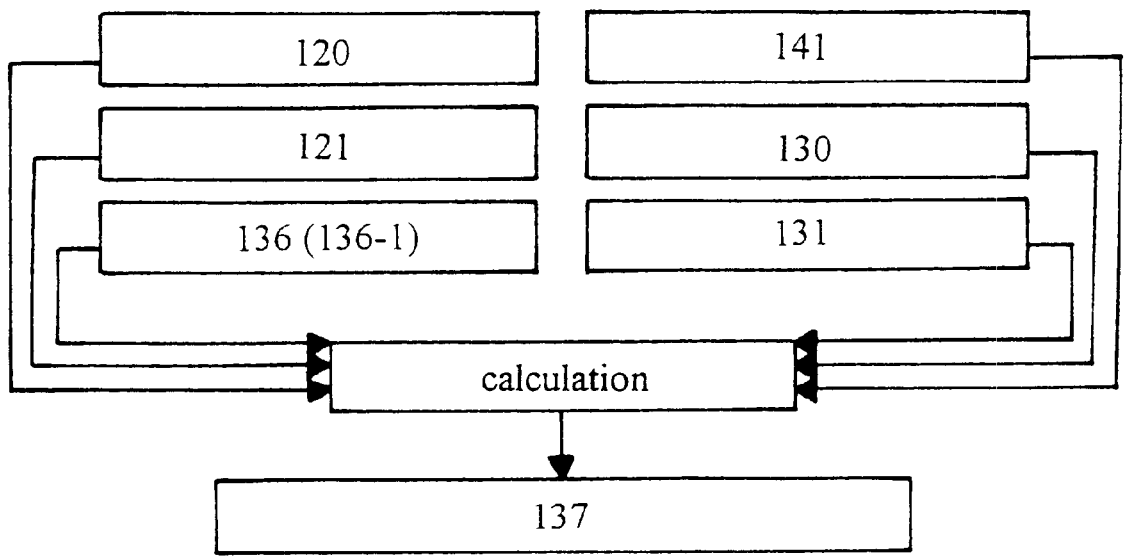
FIG. 24 is a flow chart of a preferred computer process for calculation of an anticipated collision point inside of the roadway vehicle.

A preferred computer process for calculating an anticipated collision point inside of the roadway vehicle 137 may be best understood by referring to FIG. 24. A calculation of 137 is made based on the following information:
1. a moving speed of the roadway obstacle relative to the roadway vehicle 120 (referring to FIG. 33);
2. a direction of motion of the roadway obstacle relative to the roadway vehicle 121 (referring to FIG. 33);
3. an anticipated real collision point based on disaccord 136 or accord 136-1 (referring to FIG. 22 and FIG. 23);
4. a comparison of the weight of the roadway obstacle to the weight of the roadway vehicle 141 (referring to FIG. 28);
5. position, posture, and size of passengers 130 (referring to FIG. 35); and
6. weight of passengers 131 (referring to FIG. 35).

Figure 25:
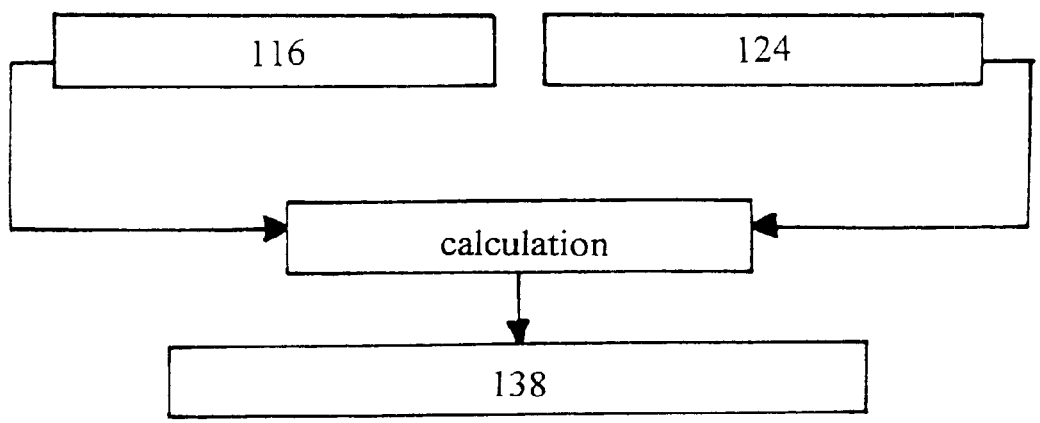
FIG. 25 is a flow chart of a preferred computer process for comparison of the nature of a roadway obstacle to the nature of the roadway vehicle.

A preferred computer process for a comparison of the nature of a roadway obstacle to the nature of the roadway vehicle 138 according to the present invention is illustrated by the flow chart shown in FIG. 25. This comparison is based on the information pertaining to the nature of the roadway vehicle 116 (referring to FIG. 32) and the nature of the roadway obstacle 124 (referring to FIG. 33 and FIG. 34).

Figure 26:
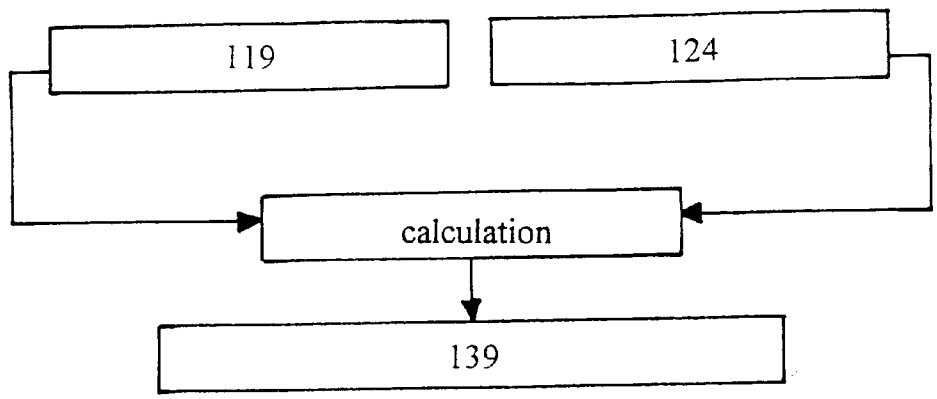
FIG. 26 is a flow chart of a preferred computer process for comparison of the nature of a roadway obstacle to the nature of an external air bag on the roadway vehicle.

A preferred computer process for a comparison of the nature of the roadway obstacle to the nature of an external air bag of the roadway vehicle 139 according to the present invention is illustrated by the flow chart shown in FIG. 26. This comparison is based on the information pertaining to the nature of an external air bag of the roadway vehicle 119 (referring to FIG. 32) and the information pertaining to the nature of the roadway obstacle 124 (referring to FIG. 33 and FIG. 34).

Figure 27:
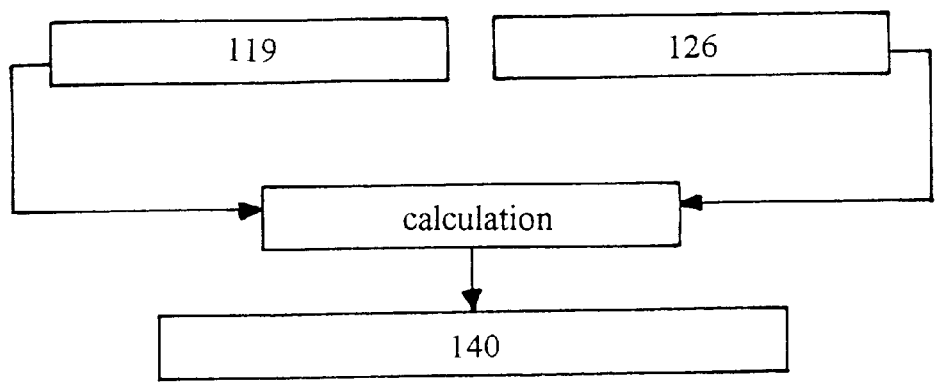
FIG. 27 is a flow chart of a preferred computer process for comparison of the nature of an external air bag on the roadway obstacle to the nature of an external air bag on the roadway vehicle.

A preferred computer process for a comparison of the nature of an external air bag of the roadway obstacle to the nature of an external air bag of the roadway vehicle 140 according to the present invention is illustrated by the flow chart shown in FIG. 27. This comparison is based on information pertaining to the nature of an external air bag of the roadway vehicle 119 (referring to FIG. 32) and information pertaining to the nature of an external air bag of the roadway obstacle 126 (referring to FIG. 33 and FIG. 34).

Figure 28:
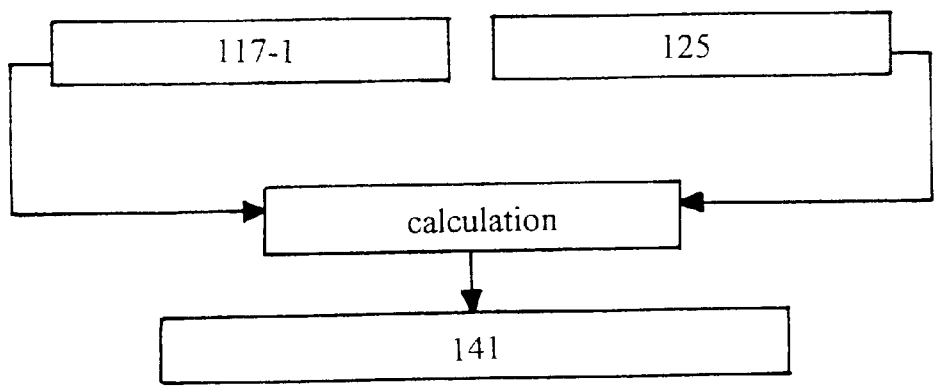
FIG. 28 is a flow chart of a preferred computer process for comparison of the weight of a roadway obstacle to the weight of the roadway vehicle.

A preferred computer process for a comparison of the weight of the roadway obstacle to the weight of the roadway vehicle 141 according to the present invention is illustrated by the flow chart shown in FIG. 28. This comparison is calculated based on the weight of the roadway obstacle 125 (referring to FIG. 33 and FIG. 34) and a gross weight of the roadway vehicle 117-1 (referring to FIG. 29).

Figure 29:
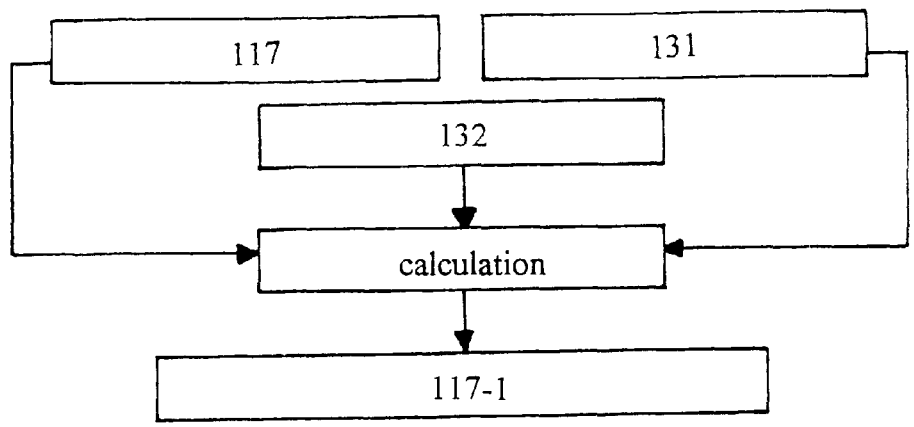
FIG. 29 is a flow chart of a preferred computer process for calculation of an automobile's total combined weight (including automobile body, any passengers, and goods).

A preferred computer process for calculating a gross weight of the roadway vehicle 117-1 according to the present invention is illustrated by the flow chart shown in FIG. 29. The gross weight of the roadway vehicle 117-1 is calculated based on the net weight of the roadway vehicle 117 (referring to FIG. 32), the weight of all passengers in the roadway vehicle 131 (referring to FIG. 35), and the weight of the goods in the roadway vehicle 132 (referring to FIG. 35).

A preferred computer process for calculating a minimum allowable distance window 114-1 according to the present invention is illustrated by the flow chart shown in FIG. 30. The minimum allowable distance window 114-1 is calculated based on a minimum allowable time window 114 (referring to FIG. 32), a moving speed of the roadway obstacle relative to the roadway vehicle 120 (referring to FIG. 33), a direction of motion of the roadway obstacle relative to the roadway vehicle 121 (referring to FIG. 33), and an anticipated collision point 134 (referring to FIG. 19).

Figure 31:
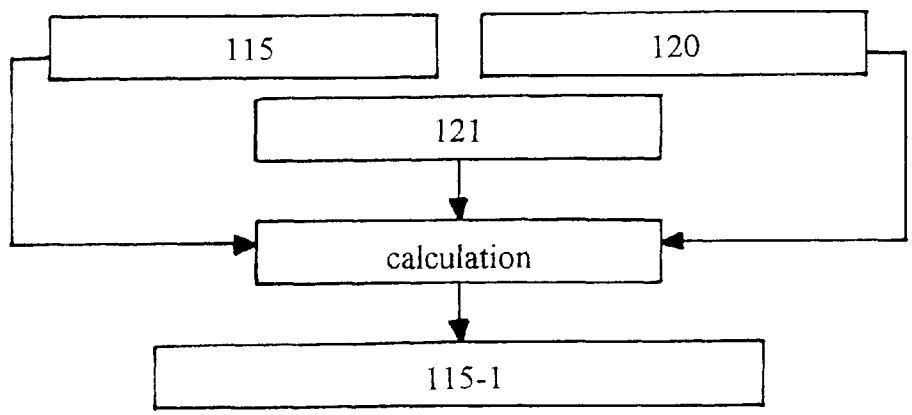
FIG. 31 is a flow chart of a preferred computer process for calculation of an estimated distance from a detection point at which a roadway obstacle is detected to a point of impact between an external air bag of the roadway vehicle and a roadway obstacle.

A preferred computer process for calculating a distance 115-1 that begins from a detection point on a roadway obstacle 27 when the roadway obstacle 27 is detected by the external detection system 26 on the roadway vehicle, to a point of impact between an inflated external air bag of the roadway vehicle 12 and the roadway obstacle 27 is shown in FIG. 31. The distance 115-1 is calculated based on an estimated period of time in speed 115 that elapses between the point in time when the roadway obstacle 27 is detected and the point in time when the roadway obstacle collides against an inflated external air bag of the roadway vehicle (referring to FIG. 32), a moving speed of the roadway obstacle relative to the roadway vehicle 120 (referring to FIG. 33), and a direction of motion of the roadway obstacle relative to the roadway vehicle 121 (referring to FIG. 33).

A variety of information must be inputted into the CPU 30 prior to using the air bag system 10 to enable the CPU 30 to function according to the present invention. FIG. 32 shows a list of information that is inputted into the CPU 30 by using a computer input device. A more detailed description of this information is provided below.

Reference numeral 106 designates information relating to a criterion for inflation of an external air bag of the roadway vehicle. According to the present invention, establishment of this criterion may be achieved through experimentations. The present invention anticipates a variety of the criteria based on the following conditions:

1. a moving speed of a roadway obstacle relative to the roadway vehicle 120;
2. a direction of motion of the roadway obstacle relative to the roadway vehicle 121;
3. a comparison of the nature of the roadway obstacle to the nature of the roadway vehicle 138; and
4. a collision point.

Reference numeral 107 designates information relating to inflation sizes and shapes of an external air bag of the roadway vehicle based on various collision situations.

First, the external air bag's inflation sizes are established through experimentation and it is varied according to a volume of space to be occupied by the inflated external air bag 143.

Second, the volume of space to be occupied by the external air bag is varied according to the following conditions:

1. a minimum allowable time (or distance) window of the roadway vehicle 114 (or 114-1);
2. an estimated period of time in speed (or distance) 115 (or 115-1) that covers from a detection point at which a roadway obstacle is detected to a point of impact between an inflated external air bag of the roadway vehicle and the roadway obstacle;
3. an anticipated collision point 134;
4. a moving speed of the roadway obstacle relative to the roadway vehicle 120;
5. a moving location of the roadway obstacle relative to the roadway vehicle based on shapes of the roadway vehicle and the roadway obstacle and sizes of both the shapes 133; and
6. an external air bag inflation device in an applicable zone of the roadway vehicle 145.

If disaccord exists between an anticipated collision point and the location of an external air bag of the roadway obstacle, an inflation size of the external air bag of the roadway vehicle is to be settled according to the space to be occupied by the inflated external air bag of the roadway vehicle. Alternatively, if accord exists, the inflation size of the external air bag of the roadway vehicle shall be half the inflation size of the external air bag of the roadway vehicle when disaccord exists.

Reference numeral 108 designates absorption quantities of an external air bag in conformity with impact intensity. Absorption quantities of an external air bag are approximated based on experimentation. An absorption quantity is varied based on impact intensity. According to the present invention, the impact intensity includes intensity of the impact inflicted to the roadway vehicle, roadway obstacle, passengers, and pedestrians.

Approximations of impact intensity are based on accord or disaccord being found between an anticipated collision point and the location of an external air bag inflation device on the roadway obstacle. When there is disaccord, impact intensity is varied based on the following conditions:

1. a moving speed of the roadway obstacle relative to the roadway vehicle 120;
2. a direction of motion of the roadway obstacle relative to the roadway vehicle 121;
3. a collision point;
4. a comparison of the weight of the roadway obstacle to the weight of the roadway vehicle 141;
5. a comparison of the nature of the roadway obstacle to the nature of an external air bag of the roadway vehicle 139; and
6. an inflation size and shape of an external air bag in an applicable zone of the roadway vehicle.

When there is accord, impact intensity is varied based on the following conditions:

1. a moving speed of the roadway obstacle relative to the roadway vehicle 120;
2. a direction of motion of the roadway obstacle relative to the roadway vehicle 121;
3. a collision point;
4. a comparison of the weight of the roadway obstacle to the weight of the roadway vehicle 141;
5. a comparison of the nature of an external air bag of the roadway obstacle to the nature of an external air bag of the roadway vehicle 140;
6. an inflation size and shape of an external air bag in an applicable zone of the roadway vehicle; and
7. an inflation size and shape of an external air bag in an applicable zone of the roadway obstacle.

Reference numeral 109 designates a criterion for estimating injury inflicted to passengers from a collision in spite of an external air bag used and for protecting passengers from a collision. The criterion 109 is used for a calculation of an inflation of an internal air bag of the roadway vehicle. The criterion 109 is derived through experimentation and varied based on two conditions. First, when disaccord exists between an anticipated collision point and the location of an external air bag inflation device on the roadway obstacle, the criterion 109 is varied based on the following conditions:

1. a moving speed of the roadway obstacle relative to the roadway vehicle 120;
2. a direction of motion of the roadway obstacle relative to the roadway vehicle 121;
3. a collision point;
4. a comparison of the weight of the roadway obstacle to the weight of the roadway vehicle 141;
5. a comparison of the nature of the roadway obstacle to the nature of an external air bag of the roadway vehicle 139; and
6. an inflation size and absorption quantity of an external air bag in an applicable zone of the roadway vehicle.

Second, when accord exists between an anticipated collision point and the location of an external air bag inflation device on the roadway obstacle, the criterion 109 is varied based on the following conditions:

1. a moving speed of the roadway obstacle relative to the roadway vehicle 120;
2. a direction of motion of the roadway obstacle relative to the roadway vehicle 121;
3. a collision point;
4. a comparison of the weight of the roadway obstacle to the weight of the roadway vehicle 141;
5. a comparison of the nature of an external air bag of the roadway obstacle to the nature of an external air bag of the roadway vehicle 140;
6. an inflation size and an absorption quantity of an external air bag in an applicable zone of the roadway vehicle; and
7. an inflation size and an absorption quantity of an external air bag in an applicable zone of the roadway obstacle.

Reference numeral 110 designates the information that is inputted into the CPU relating to inflation sizes and shapes of an internal air bag of the roadway vehicle. Inflation sizes of an internal air bag is derived through experimentation as the size is varied according to the space to be occupied by an inflated internal air bag of the roadway vehicle. The space is varied based on the following factors:

1. an anticipated collision point inside of the roadway vehicle 137;
2. position, posture, and size of passengers 130; and
3. an internal air bag inflation device in an applicable zone of the roadway vehicle 146.

Reference numeral 111 designates information that is inputted into the CPU relating to absorption quantities of an internal air bag on the roadway vehicle. The absorption quantities are derived through experimentation based on an impact intensity. When disaccord 135 exists between an anticipated collision point and the location of an external air bag inflation device on the roadway obstacle, the absorption quantities of an internal air bag of the roadway vehicle 111 are derived through experimentation based on the following conditions:

1. a moving speed of the roadway obstacle relative to the roadway vehicle 120;
2. a direction of motion of the roadway obstacle relative to the roadway vehicle 121;
3. a collision point;
4. a comparison of the weight of the roadway obstacle to the weight of the roadway vehicle 141;
5. a comparison of the nature of the roadway obstacle to the nature of an external air bag of the roadway vehicle 139;
6. an inflation size and an absorption quantity of an external air bag in an applicable zone on the roadway vehicle;
7. position, posture, and size of passengers 130; and
8. weight of passengers 131.

When accord exists between an anticipated collision point and the location of an external air bag inflation device on the roadway obstacle, the absorption quantities of an internal air bag of the roadway vehicle 111 are derived based on the following conditions:

1. a moving speed of the roadway obstacle relative to the roadway vehicle 120;
2. a direction of motion of the roadway obstacle relative to the roadway vehicle 121;
3. a collision point;
4. a comparison of the weight of the roadway obstacle to the weight of the roadway vehicle 141;
5. a comparison of the nature of an external air bag of the roadway obstacle to the nature of an external air bag of the roadway vehicle 140;
6. an inflation size and an absorption quantity of an external air bag in an applicable zone of the roadway vehicle;
7. an inflation size and an absorption quantity of an external air bag in an applicable zone of the roadway obstacle;
8. position, posture, and size of passengers 130; and
9. weight of passengers 131.

Below is a list of additional information that is also inputted into the CPU 30 prior to using the air bag system 10 to enable the CPU 30 to control the inflation of internal and external air bags according to the present invention:

1. an information pertaining to the location of each external air bag inflation device on the roadway vehicle 112;
2. an information pertaining to the location of each internal air bag inflation device on the roadway vehicle 113;
3. a minimum allowable time window 114; (within which an evasive action is not available prior to a collision)
4. an estimated period of time in speed 115; (which elapses between a point in time when a roadway obstacle is detected and a point in time when the roadway obstacle collides against an inflated external air bag of the roadway vehicle)
5. the nature of the roadway vehicle 116;
6. the net weight of the roadway vehicle 117;
7. the shape of the roadway vehicle and size of the shape 118; and
8. the nature of an external air bag of the roadway vehicle 119.

Further detailed information generated by the CPU 30 based on the information obtained by the external detection system 26 is listed in the following as shown in FIG. 33.

1. a moving speed of the roadway obstacle relative to the roadway vehicle 120;
2. a direction of motion of the roadway obstacle relative to the roadway vehicle 121;
3. a moving location of the roadway obstacle relative to the first sensing device on the roadway vehicle based on shape of the roadway obstacle and size of the shape 122; (This information is obtained by the first sensing device 40 of the external detection system 26.)
4. a location of an external air bag inflation device on the roadway obstacle 123;
5. nature of the roadway obstacle 124,
6. weight of the roadway obstacle 125;
7. nature of an external air bag of the roadway obstacle 126;
8. a moving location of the roadway obstacle relative to the roadway vehicle based on shapes of the roadway vehicle and the roadway obstacle and sizes of both the shapes 133. (This information is obtained by the second sensing device 42 and the third sensing device 44 of the external detection system 26.)

Information generated by the CPU 30 based on the information transmitted by the wireless system 29 is listed in the following as shown in FIG. 34.

1. a location of an external air bag inflation device on the roadway obstacle 123;
2. nature of the roadway obstacle 124;
3. weight of the roadway obstacle 125;
4. nature of an external air bag on the roadway obstacle 126;
5. a location of the roadway obstacle 127;
6. an inflation size and shape of an external air bag in an applicable zone on the roadway obstacle 128; and
7. an absorption quantity of an external air bag in an applicable zone on the roadway obstacle 129.

Information generated by the CPU 30 based on the information obtained by the internal detection system 28 is listed in the following as shown in FIG. 35:

1. position, posture, and size of passengers 130;
2. weight of passengers 131;
3. weight of goods 132.

Figure 36:
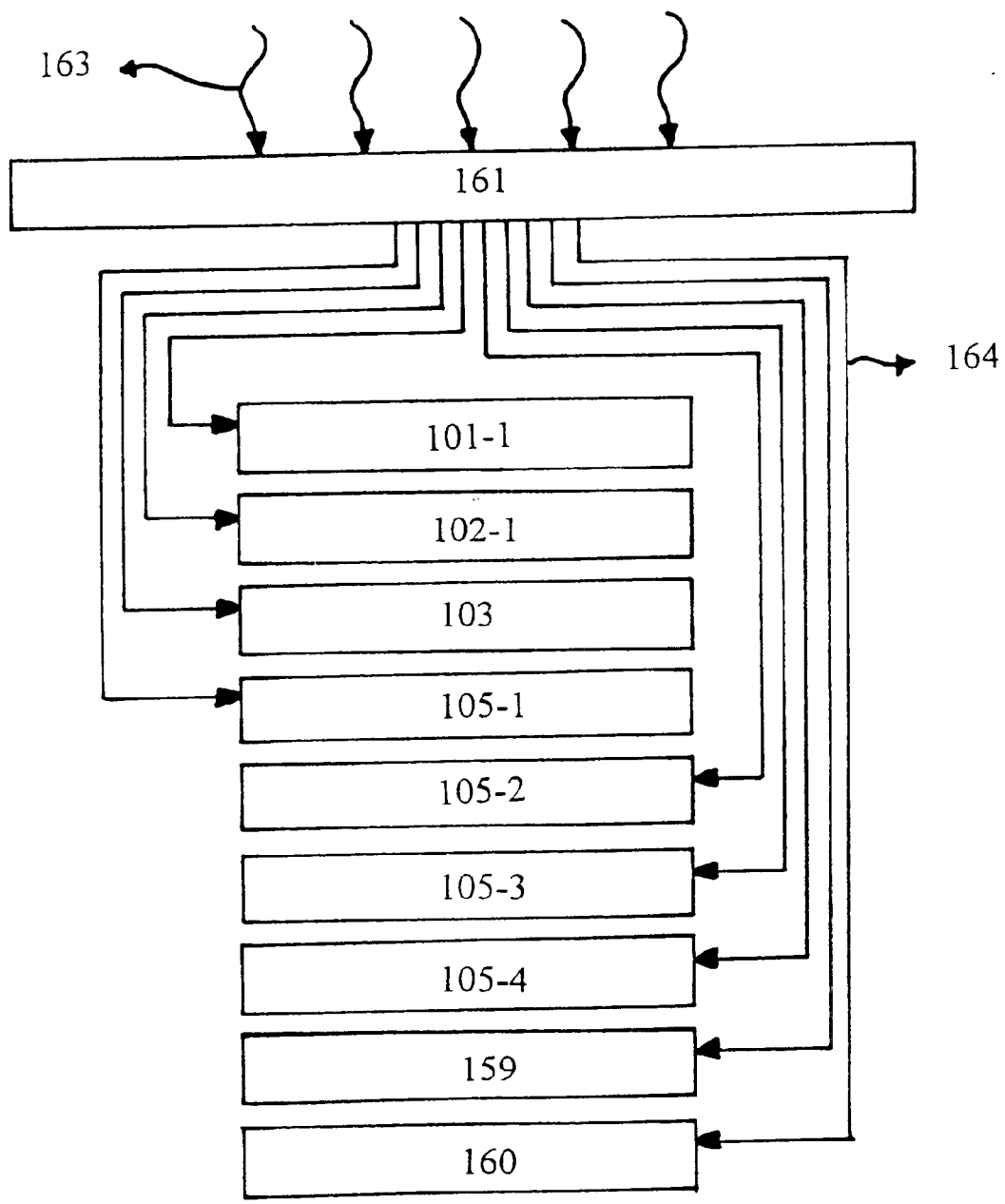
FIG. 36 is a block diagram of a photoelectron system according to a preferred embodiment of the invention.

The present invention anticipates that any energy source may be used for supplying electrical energy to the air bag system 10. For example, a block diagram of a preferred embodiment of the air bag system 10 that includes a photoelectron system 161 is shown in FIG. 36. The photoelectron system 161 is being used in various industrial fields and incorporates a technology to convert photon into electricity for supplying electrical energy to the relevant parts of the air bag system 10 where electricity is required for the function of the air bag system 10.

Figure 37:
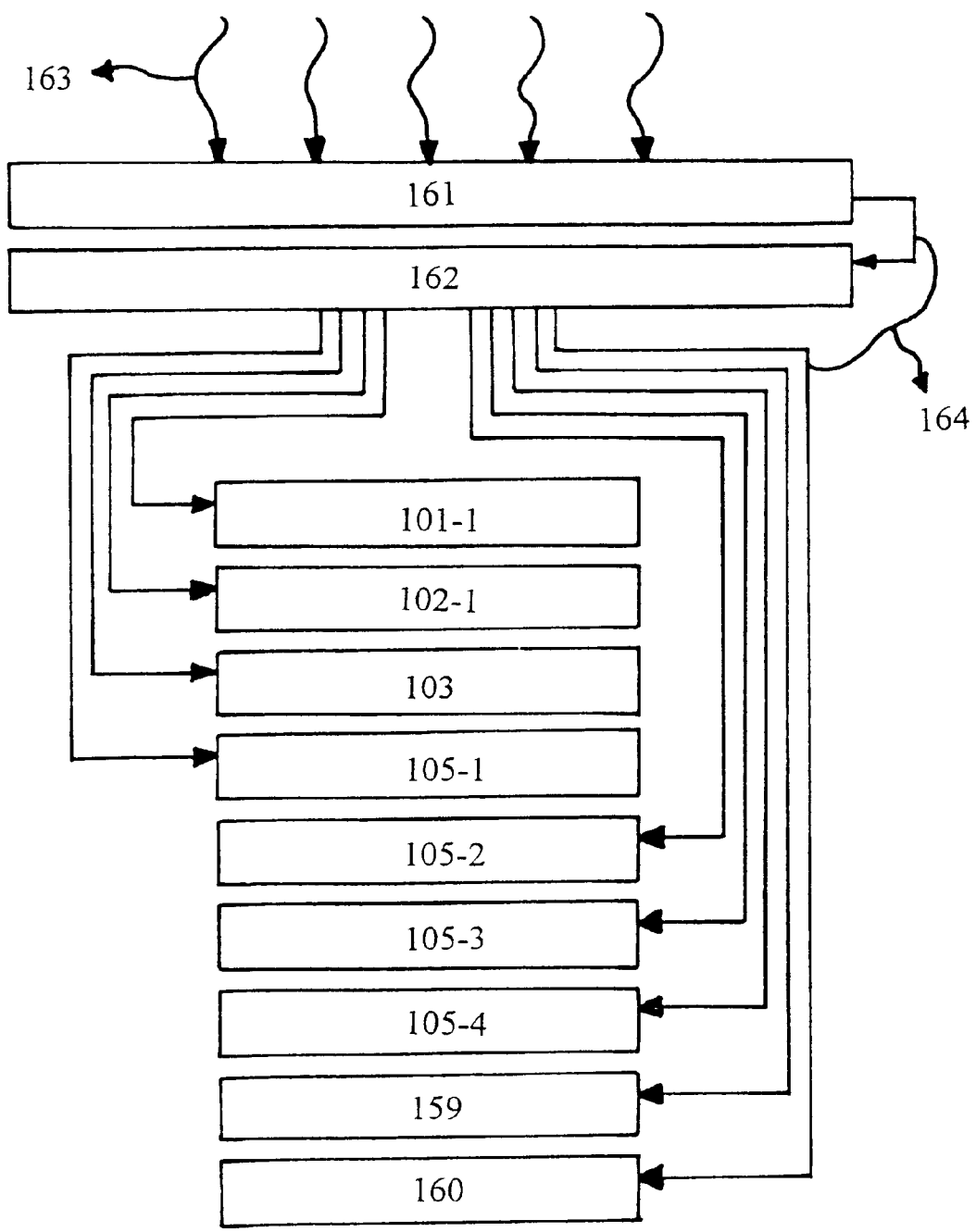
FIG. 37 is a block diagram of a preferred system for supplying electric energy to relevant parts via the conventional battery from the photoelectron system.

Alternatively, a conventional battery 162 may be used in connection with photoelectron system 161 for supplying energy to the air bag system 10. FIG. 37 shows a block diagram of a preferred embodiment of the air bag system 10 utilizing a conventional battery 162. As shown, electricity generated from the photoelectron system 161 may be used for continuous electric supply to the battery 162 for charging the battery. Accordingly, the battery 162 becomes to supply electric energy eternally without replacement of the battery 162 to the relevant parts of the air bag system 10.

APPENDIX

Technical Terminology of the Present Invention

| | Ref No | Terminologies |
|---|---|---|
| 1. | 12 | roadway vehicle |
| 2. | 16 | automobile body |
| 3. | 26 | external detection system (including first sensing device 40, second sensing device 42, and third sensing device 44) |
| 4. | 27 | roadway obstacle (including other vehicle, object, and pedestrian) |
| 5. | 28 | internal detection system (including first sensor 50, second sensor 52, third sensor 54, and fourth sensor 56) |
| 6. | 29 | wireless system (including first wireless apparatus 68, second wireless apparatus 70, third wireless apparatus 72, and fourth wireless apparatus 74) |
| 7. | 30 | CPU (computer processing unit) |
| 8. | 36 | steering wheel |
| 9. | 40 | first sensing device (installed in the roadway vehicle 12) |
| 10. | 42 | second sensing device (installed in the roadside lamp post 46) |
| 11. | 44 | third sensing device (installed in the satellite 48) |
| 12. | 45 | fourth sensing device (installed in the roadway obstacle 27) |
| 13. | 46 | roadside lamp post |
| 14. | 48 | satellite |
| 15. | 50 | first sensor (including radiant energy, sonic energy, and camera for detecting sitting posture, position, size, weight of passenger and driver) |
| 16. | 52 | second sensor (detecting sitting posture, position, size of passenger and driver according to number of sensor's revolution) |
| 17. | 54 | third sensor (detecting sitting posture, location, size, weight of passenger and driver by use of pressure made by weight of passenger and driver) |
| 18. | 56 | fourth sensor (installed under the trunk to detect weight of goods by use of pressure made by goods) |
| 19. | 60 | passengers' seat |
| 20. | 62 | seat belt |
| 21. | 68 | first wireless apparatus (installed in roadway vehicle 12) |
| 22. | 70 | second wireless apparatus (installed in roadway obstacle 27) |
| 23. | 72 | third wireless apparatus (connected with the third sensing device 44) |
| 24. | 74 | fourth wireless apparatus (connected with the second sensing device 42) |
| 25. | 76 | air bag (including external air bag and internal air bag) |
| 26. | 80 | air bag inflation device (including external air bag inflation device and internal air bag inflation device) |
| 27. | 92 | first air space |
| 28. | 94 | secondary air space |
| 29. | 104 | roadside barrier |
| 30. | 104-1 | front bumper |
| 31. | 106 | criterion for inflation of an external air bag of the roadway vehicle (inputted in CPU) |
| 32. | 107 | inflation sizes and shapes of an external air bag of the roadway vehicle based on various collision situations (inputted in CPU) |
| 33. | 108 | absorption quantities of an external air bag of the roadway vehicle in conformity with impact intensity (inputted in CPU) |
| 34. | 109 | criterion for estimating injury inflicted to passengers from a collision (inputted in CPU) (This criterion is aimed at protection of passengers from being injured from a collision despite of an external air bag used and is for inflation of an internal air bag in an applicable zone of the roadway vehicle.) |
| 35. | 110 | inflation sizes and shapes of an internal air bag of the roadway vehicle (inputted in CPU) |
| 36. | 111 | absorption quantities of an internal air bag of the roadway vehicle (inputted in CPU) |
| 37. | 112 | location of each external air bag inflation device on the roadway vehicle (inputted in CPU) |
| 38. | 113 | location of each internal air bag inflation device on the roadway vehicle (inputted in CPU) |
| 39. | 114 | minimum allowable time window (MATW) (Within which a driver is unable to take an evasive action to avoid an anticipated collision under the assumption of no external air bag used.) (inputted in CPU) |
| 40. | 114-1 | minimum allowable distance window (MADW) (Within which a driver is unable to take an evasive action prior to a collision.) |
| 41. | 115 | an estimated period of time in speed (Which elapses between a point in time when a roadway obstacle is detected and a point in time when the roadway obstacle collides against an inflated external air bag of the roadway vehicle.) (inputted in CPU) |
| 42. | 115-1 | an estimated distance (Which covers from a detection point at which a roadway obstacle is detected to a point of impact between an inflated external air bag of the roadway vehicle and a roadway obstacle.) |
| 43. | 116 | nature of the roadway vehicle (inputted in CPU) (comprising body material of the roadway vehicle, solidity, impact absorbability, kind of vehicle) |
| 44. | 117 | the net weight of the roadway vehicle (inputted in CPU) |
| 45. | 117-1 | a gross weight of the roadway vehicle (including weight of passengers and weight of goods) |
| 46. | 118 | shape of the roadway vehicle and size of the shape (inputted in CPU) |

APPENDIX-continued

Technical Terminology of the Present Invention

| Ref No | | Terminologies |
|---|---|---|
| 47. | 119 | nature of an external air bag of the roadway vehicle (inputted in CPU) (comprising material, solidity, elasticity of the external air bag of the roadway vehicle) |
| 48. | 120 | a moving speed of the roadway obstacle relative to the roadway vehicle |
| 49. | 121 | a direction of motion of the roadway obstacle relative to the roadway vehicle |
| 50. | 122 | a moving location of the roadway obstacle relative to the first sensing device on the roadway vehicle based on shape of the roadway obstacle and size of the shape (This moving location comprises meaning of a moving direction of a roadway obstacle relative to the first sensing device of the roadway vehicle and a distance between the first sensing device of the roadway vehicle and the roadway obstacle.) |
| 51. | 123 | the location of an external air bag inflation device on the roadway obstacle |
| 52. | 124 | nature of the roadway obstacle (comprising body material of a roadway obstacle, solidity, impact absorbability, kind of object) |
| 53. | 125 | weight of the roadway obstacle (comprising total weight of the roadway obstacle with occupants and goods) |
| 54. | 126 | nature of an external air bag on the roadway obstacle (comprising material, solidity, elasticity of the external air bag of the roadway obstacle) |
| 55. | 127 | a location of the roadway obstacle |
| 56. | 128 | an inflation size and shape of an external air bag in an applicable zone of the roadway obstacle |
| 57. | 129 | an absorption quantity of an external air bag in an applicable zone of the roadway obstacle |
| 58. | 130 | position, posture, and size of passenger |
| 59. | 131 | weight of passenger |
| 60. | 132 | weight of goods |
| 61. | 133 | a moving location of the roadway obstacle relative to the roadway vehicle based on shapes of the roadway vehicle and the roadway obstacle and sizes of both the shapes (Moving location of the roadway obstacle comprises meanings of moving direction of the roadway obstacle relative to the roadway vehicle and distance between moving roadway vehicle and moving roadway obstacle.) |
| 62. | 134 | anticipated collision point (comprising meaning of physical point of a collision between the roadway obstacle and the roadway vehicle, time or geographical point) |
| 63. | 135 | disaccord between an anticipated collision point and the location of an external air bag inflation device of the roadway obstacle (This explains that an external air bag inflation device is not installed where an anticipated collision point is expected.) |
| 64. | 135-1 | accord between an anticipated collision point and the location of an external air bag inflation device of the roadway obstacle (This explains that an external air bag inflation device is installed where an anticipated collision point is expected.) |
| 65. | 136 | an anticipated real collision point based on disaccord (This indicates a disaccord relation between both collision points on the inflated external air bag of the roadway vehicle and body of the roadway obstacle.) |
| 66. | 136-1 | an anticipated real collision point based on accord (This indicates an accord relation between both collision points on the inflated external air bags of the roadway vehicle and the roadway obstacle.) |
| 67. | 137 | an anticipated collision point inside of the roadway vehicle (This means an internal collision point that is calculated for the place where driver or passenger is anticipated to be inflicted.) |
| 68. | 138 | a comparison of the nature of the roadway obstacle to the nature of the roadway vehicle |
| 69. | 139 | a comparison of the nature of the roadway obstacle to the nature of an external air bag of the roadway vehicle |
| 70. | 140 | a comparison of the nature of an external air bag of the roadway obstacle to the nature of an external air bag of the roadway vehicle |
| 71. | 141 | a comparison of the weight of the roadway obstacle to the weight of the roadway vehicle |
| 72. | 142 | an anticipated damage (for 147) |
| 73. | 142-1 | an anticipated impact intensity (for 149) |
| 74. | 142-2 | an anticipated damage (for 150) |
| 75. | 142-3 | an anticipated impact intensity (for 152) |
| 76. | 143 | a volume of space to be occupied by an inflated external air bag of the Roadway vehicle (This space must be a little smaller than the space between the roadway obstacle and the location of an external air bag inflation device on the roadway vehicle in order to prevent the roadway obstacle from being hit by the air bag.) |
| 77. | 144 | a volume of space to be occupied by the inflated internal air bag of the roadway vehicle (This space must be a little smaller than the space between the passengers and the location of an internal air bag inflation device in order to have passengers prevented from a striking of the air bag.) |
| 78. | 145 | an external air bag inflation device in an applicable zone of the roadway vehicle |
| 79. | 146 | an internal air bag inflation device in an applicable zone of the roadway vehicle |
| 80. | 147 | criterion for inflation of an external air bag in an applicable zone of the roadway vehicle |
| 81. | 148 | calculation of an inflation size and shape of an external air bag in an applicable zone of the roadway vehicle |
| 82. | 149 | calculation of an absorption quantity of an external air bag in an applicable zone of the roadway vehicle |
| 83. | 150 | criterion for inflation of an internal air bag in an applicable zone of the roadway vehicle |
| 84. | 151 | calculation of an inflation size and shape of an internal air bag in an applicable zone of the roadway vehicle |
| 85. | 152 | calculation of an absorption quantity of an internal air bag in an applicable zone of the roadway vehicle |
| 86. | 153 | inflator of an air bag inflation device |
| 87. | 154 | external layer of an air bag |
| 88. | 154-1 | internal layer of an air bag |
| 89. | 155 | roller of an air bag inflation device |
| 90. | 156 | first roller sensor |
| 91. | 156-1 | second roller sensor |
| 92. | 157 | motor for an air bag inflation device |
| 93. | 158 | an absorption device (valve or port) on the external layer of the air bag |
| 94. | 158-1 | an absorption device (valve or port) on the internal layer of the air bag |
| 95. | 159 | an external air bag inflation device |
| 96. | 160 | an internal air bag inflation device |
| 97. | 161 | photoelectron system |
| 98. | 162 | battery |
| 99. | 163 | photon |
| 100. | 164 | electricity |
| 101. | 165 | detectable coating material (This coating material helps the external detection system discern the objects accurately.) |

What is claimed is:

1. An air bag system installed in a vehicle for protecting vehicles, passengers, roadside objects, and pedestrians from being damaged and injured at a collision, the air bag system comprising:

means for using an external detection system for obtaining information relating to a roadway obstacle, a roadway vehicle and roadway conditions;

means for using an internal detection system installed inside of the roadway vehicle for obtaining information on passengers' conditions inside of the roadway vehicle;

means for using a wireless system for obtaining required information to function the air bag system;

means for a computer processing unit (hereinafter referred to as CPU) installed in the roadway vehicle to process information obtained by said external detection system, said internal detection system, and said wireless system based on information inputted in said CPU, said CPU having a means for calculating of a criterion for inflation of an external air bag, calculating inflation size and shape of the external air bag, and calculating absorption quantity of the external air bag, and said CPU having a means for calculating a criterion for inflation of an internal air bag and calculating absorption quantity of the internal air bag;

means for using at least one external air bag inflation device installed in the roadway vehicle, said at least one external air bag inflation device having an external air bag installed therein for inflating said external air bag prior to a collision over an external portion of the roadway vehicle in an imminent situation to reduce collision damage to the vehicle and obstacles, injury to passengers and pedestrians;

means for using at least one internal air bag inflation device installed in the roadway vehicle, said at least one internal air bag inflation device having an internal air bag installed therein for inflating said internal air bag toward the passengers of the roadway vehicle prior to a collision in an imminent situation to reduce injury to the passengers;

means for deciding an inflation size of each external and internal air bag according to a roller connected to a motor controlled by said CPU installed in an air bag inflation device in the vehicle;

said external air bag inflation device and said internal air bag inflation device comprising:

an air bag, one end of which being attached to a roller for enabling said roller to release said air bag from a retracted condition by the roller rotating in a first direction;

a roller rotatably positioned inside of said air bag inflation device for enabling the roller to rotate for controlling inflation size of said air bag;

a motor attached to the roller for rotatably driving the roller, the motor being rotatable in a second direction for opposing rotation of the roller, by which the releasing of said air bag is stopped at required inflation size to hold the inflation of said air bag;

a first roller sensor attached to an inside surface of said air bag inflation device surrounding the roller to help detect the number of rotations of said roller;

a second roller sensor attached to an outside surface of said roller for providing a means by which number of rotations of the roller is detected;

a first absorption device connected to an external layer of said air bag to provide a primary means for relieving a collision impact intensity imposed on said air bag in an inflated shape;

a second absorption device connected to an internal layer of said air bag to provide a secondary means for relieving a collision impact intensity imposed on said air bag in an inflated shape; and a photoelectron system used for supplying energy to air bag system, which is currently used in the industries.

2. The system recited in claim 1, wherein said external detection system comprises:

a first sensing device installed in a roadway vehicle for detecting obstacles surrounding the roadway vehicle;

a second sensing device installed on a lamp post along the road for detecting information relating to the roadway conditions;

a third sensing device installed in a communication satellite in the earth's atmosphere for detecting roadway conditions;

a fourth sensing device installed in a roadway obstacle for detecting roadway conditions around the roadway obstacle.

3. The system recited in claim 2, wherein said external detection system further comprises:

a coating material placed on a dangerous object that may possibly give damage to automobile, injury to passengers, or damage to object itself by the automobile at collision, said coating material capable of being detected by said external detection system for distinguishing an obstacle accurately to let said CPU determine whether or not an inflation of the air bag is required against the object; and said coating material for being placed on said external air bag inflation device or an external surface of the body of the vehicle where said external air bag inflation device is internally installed for having said external detection system easily confirm existence of said external air bag inflation device or a location of said external air bag inflation device if it is therein.

4. The system recited in claim 1, wherein said wireless system comprises:

a first wireless apparatus installed in the roadway vehicle for receiving and transmitting information from and to said CPU;

a second wireless apparatus installed in the roadway obstacle for transmitting information relating to the roadway obstacle to said first wireless apparatus;

a third wireless apparatus installed in a satellite for transmitting information relating to a roadway situation to said first wireless apparatus from a position situated in the earth's atmosphere; and a fourth wireless apparatus installed on a lamp post for transmitting information relating to a roadway situation to said first wireless apparatus from a position situated along the roadside.

5. The system recited in claim 4, wherein said first wireless apparatus receives and transmits information from and to said CPU and also transmits the information to said second wireless apparatus installed on a roadway obstacle to advise the roadway obstacle on the situation of the roadway vehicle.

6. The system recited in claim 1, wherein each of said first absorption device and said second absorption device is a valve or port.

7. The system recited in claim 6, wherein said valve or port controlled by said CPU controls an absorption quantity of said external air bag.

8. The system recited in claim 6, wherein said valve or port controlled by said CPU controls an absorption quantity of said internal air bag.

9. The system recited in claim 1, wherein said CPU controls inflation size of said external air bag based on said first roller sensor and said second roller sensor.

10. The system recited in claim 1, wherein said CPU controls inflation size of said internal air bag based on said first roller sensor and said second roller sensor.

11. The system recited in claim 1, wherein said CPU controls nation size of said external air bag by controlling the roller.

12. The system recited in claim 1, wherein said CPU controls inflation size of said external air bag by controlling the motor attached to the roller.

13. The system recited in claim 1, wherein said CPU controls inflation size of said internal air bag by controlling the roller.

14. The system recited in claim 1, wherein said CPU controls inflation size of said internal air bag by controlling the motor attached to the roller.

15. The system recited in claim 1, wherein said CPU is programmed to generate signal for controlling said external air bag inflation device according to the information calculated based on the information obtained by said external detection system and said wireless system and the information inputted in said CPU.

16. The system recited in claim 1, wherein said CPU is programmed to generate signal for controlling said internal air bag inflation device according to a calculation based on the information obtained by said external detection system, said wireless system, and said internal detection system and also the information inputted in said CPU.

17. The system recited in claim 1, wherein said CPU has a processing means for calculating inflation size and absorption quantity under which said internal air bag of said roadway vehicle inflates based on the information stored in said CPU and the information obtained by said external detection system, said internal detection system, and said wireless system.

18. The system recited in claim 1, wherein said photoelectron system is installed in said roadway vehicle for an endless supply of electric energy to the relevant parts of the vehicle for an operation of the air bag system.

19. The system recited in claim 1, wherein said CPU calculates an inflation size of said external air bag of said roadway vehicle based on an external air bag inflation device in an applicable zone of said roadway vehicle.

20. The system recited in claim 1, wherein said CPU calculates an inflation size of said external air bag of said roadway vehicle based on a minimum allowable time (distance) window.

21. The system recited in claim 1, wherein said CPU calculates an inflation size of said external air bag on said roadway vehicle based on the time (distance) that elapses from a detected point on said roadway obstacle to a collision point between said external air bag of said roadway vehicle and said roadway obstacle.

22. The system recited in claim 1, wherein said CPU calculates an inflation size of said external air bag of said roadway vehicle based on an anticipated collision point.

23. The system recited in claim 1, wherein said CPU calculates an inflation size of said external air bag of said roadway vehicle based on a moving speed of said roadway obstacle relative to said roadway vehicle.

24. The system recited in claim 1, wherein said CPU calculates an inflation size of said external air bag of said roadway vehicle based on a moving location of said roadway obstacle relative to said roadway vehicle according to shapes of both said roadway vehicle and the roadway obstacle and sizes of both the shapes.

25. The system recited in claim 1, wherein said CPU calculates an inflation size of said external air bag of said roadway vehicle based on disaccord or accord between an anticipated collision point and a location of said external air bag inflation device of said roadway obstacle.

26. The system recited in claim 25, wherein said CPU calculates an inflation size of said external air bag of said roadway vehicle when accord exists, to be half the inflation size of said external air bag of said roadway vehicle based on disaccord.

27. The system recited in claim 1, wherein said CPU calculates an absorption quantity of said external air bag of said roadway vehicle based on disaccord or accord between an anticipated collision point and a location of said external air bag inflation device of said roadway obstacle.

28. The system recited in claim 27, wherein said CPU calculates an absorption quantity of said external air bag of said roadway vehicle based on an anticipated real collision point according to disaccord.

29. The system recited in claim 27, wherein said CPU calculates an absorption quantity of said external air bag of said roadway vehicle based on a comparison of the nature of said roadway obstacle to the nature of sad external air bag of said roadway vehicle according to disaccord.

30. The system recited in claim 27, wherein said CPU calculates an absorption quantity of said external air bag of said roadway vehicle based on an anticipated real collision point according to accord.

31. The system recited in claim 27, wherein said CPU calculates an absorption quantity of said external air bag of said roadway vehicle based on a comparison of the nature of said external air bag of said roadway obstacle to the nature of said external air bag of said roadway vehicle according to accord.

32. The system recited in claim 27, wherein said CPU calculates an absorption quantity of said external air bag of said roadway vehicle based on inflation size and shape of said external air bag in an applicable zone of said roadway obstacle according to accord.

33. The system recited in claim 27, wherein said CPU calculates an absorption quantity of said external air bag of said roadway vehicle based on a moving speed of said roadway obstacle relative to said roadway vehicle.

34. The system recited in claim 27, wherein said CPU calculates an absorption quantity of said external air bag of said roadway vehicle based on a direction of motion of said roadway obstacle relative to said roadway vehicle.

35. The system recited in claim 27, wherein said CPU calculates an absorption quantity of said external air bag of said roadway vehicle based on a comparison of the weight of said roadway obstacle to the weight of said roadway vehicle.

36. The system recited in claim 27, wherein said CPU calculates an absorption quantity of said external air bag of said roadway vehicle based on an inflation size and shape of said external air bag in an applicable zone of said roadway vehicle.

37. The system recited in claim 1, wherein said CPU calculates a criterion for inflation of said internal air bag in an applicable zone of said roadway vehicle based on disaccord or accord existing between an anticipated collision point and a location of said external air bag inflation device of said roadway obstacle.

38. The system recited in claim 37, wherein said CPU calculates a criterion for inflation of said internal air bag in an applicable zone of said roadway vehicle based on an anticipated real collision point according to disaccord.

39. The system recited in claim 37, wherein said CPU calculates a criterion for inflation of said internal air bag in an applicable zone of said roadway vehicle based on a comparison of the nature of said roadway obstacle to the nature of said external air bag of said roadway vehicle according to disaccord.

40. The system recited in claim 37, wherein said CPU calculates a criterion for inflation of said internal air bag in an applicable zone of said roadway vehicle based on an anticipated real collision point according to accord.

41. The system recited in claim 37, wherein said CPU calculates a criterion for inflation of said internal air bag in an applicable zone of said roadway vehicle based on a comparison of the nature of said external air bag of said roadway obstacle to the nature of said external air bag of said roadway vehicle according to accord.

42. The system recited in 37, wherein said CPU calculates a criterion for inflation of said internal air bag in an applicable zone of said roadway vehicle based on inflation size and shape of said external air bag in an applicable zone of said roadway obstacle according to accord.

43. The system recited in claim 37, wherein said CPU calculates a criterion for inflation of said internal air bag in an applicable zone of said roadway vehicle based on an absorption quantity of said external air bag in an applicable zone of said roadway obstacle according to accord.

44. The system recited in claim 37, wherein said CPLJ calculates a criterion for inflation of said internal air bag in an applicable zone of said roadway vehicle based on an inflation size and shape of said eternal air bag in an applicable zone of said roadway vehicle.

45. The system recited in claim 37, wherein said CPU calculates a criterion for inflation of said internal air bag in an applicable zone of said roadway vehicle based on an absorption quantity of said external air bag in an applicable zone of said roadway vehicle.

46. The system recited in claim 37, wherein said CPU calculates an absorption quantity of said internal air bag in an applicable zone of said roadway vehicle based on a comparison of the weight of said roadway obstacle to the weight of said roadway vehicle.

47. The system recited in claim 1, wherein said CPU calculates an absorption quantity of said internal air bag in an applicable zone of said roadway vehicle based on disaccord or accord existing between an anticipated collision point and a location of said external air bag inflation device of said roadway obstacle.

48. The system recited in claim 47, wherein said CPU calculates an absorption quantity of said internal air bag in an applicable zone of said roadway vehicle based on an anticipated real collision point according to disaccord.

49. The system recited in claim 47, wherein said CPU calculates an absorption quantity of said internal air bag in an applicable zone of said roadway vehicle based on a comparison of the nature of said roadway obstacle to the nature of said external air bag of said roadway vehicle according to disaccord.

50. The system recited in claim 47, wherein said CPU calculates an absorption quantity of said internal air bag in an applicable zone of said roadway vehicle based on an anticipated real collision point according to accord.

51. The system recited in claim 47, wherein said CPU calculates an absorption quantity of said internal air bag in an applicable zone of said roadway vehicle based on a comparison of the nature of said external air bag of said roadway obstacle to the nature of said external air bag of said roadway vehicle according to accord.

52. The system recited in claim 47, wherein said CPU calculates an absorption quantity of said internal air bag in an applicable zone of said roadway vehicle based on an inflation size and shape of said external air bag in an applicable zone of said roadway obstacle according to accord.

53. The system recited in claim 47, wherein said CPU calculates an absorption quantity of said internal air bag in an applicable zone of said roadway vehicle based on an absorption quantity of said external air bag in an applicable zone of said roadway obstacle according to accord.

54. The system recited in claim 47, wherein said CPU calculates an absorption quantity of said internal air bag in an applicable zone of said roadway vehicle based on a moving speed of said roadway obstacle relative to said roadway vehicle.

55. The system recited in claim 47, wherein said CPU calculates an absorption quantity of said internal air bag in an applicable zone of said roadway vehicle based on a direction of motion of said roadway obstacle relative to said roadway vehicle.

56. The system recited in claim 47, wherein said CPU calculates an absorption quantity of the internal air bag in an applicable zone of said roadway vehicle based on an inflation size and shape of said external air bag in an applicable zone of said roadway vehicle.

57. The system recited in claim 47, wherein said CPU calculates an absorption quantity of the internal air bag in an applicable zone of said roadway vehicle based on an absorption quantity of said external air bag in an applicable zone of said roadway vehicle.

58. The system recited in claim 47, wherein said CPU calculates an absorption quantity of the internal air bag in an applicable zone of said roadway vehicle based on position, posture, weight, and size of occupants.

* * * * *

UNITED STATES PATENT AND TRADEMARK OFFICE
CERTIFICATE OF CORRECTION

PATENT NO. : 6,408,237 B1
DATED : June 18, 2002
INVENTOR(S) : Daniel Myung Cho

It is certified that error appears in the above-identified patent and that said Letters Patent is hereby corrected as shown below:

<u>Title page,</u>
Item [76], should read -- Inventor's Name: Daniel Myung Cho
                                             Address : 13404 Tossa Lane, Austin, Tx 78729 --

Signed and Sealed this

Twenty-second Day of October, 2002

*Attest:*

*Attesting Officer*

JAMES E. ROGAN
*Director of the United States Patent and Trademark Office*